US012269255B2

(12) United States Patent
Watanabe et al.

(10) Patent No.: US 12,269,255 B2
(45) Date of Patent: Apr. 8, 2025

(54) PRINTING DEVICE

(71) Applicant: SEIKO EPSON CORPORATION, Tokyo (JP)

(72) Inventors: Yuta Watanabe, Matsumoto (JP); Yoshitsugu Tokai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 115 days.

(21) Appl. No.: 18/341,274

(22) Filed: Jun. 26, 2023

(65) Prior Publication Data

US 2023/0415497 A1 Dec. 28, 2023

(30) Foreign Application Priority Data

Jun. 28, 2022 (JP) ................................ 2022-103232

(51) Int. Cl.

| | |
|---|---|
| ***B41J 11/00*** | (2006.01) |
| ***B41J 2/14*** | (2006.01) |
| *B41J 2/21* | (2006.01) |

(52) U.S. Cl.

CPC ..... *B41J 11/00224* (2021.01); *B41J 2/14201* (2013.01); *B41J 11/00214* (2021.01); *B41J 2/21* (2013.01)

(58) Field of Classification Search

CPC .............. B41J 11/00224; B41J 2/14201; B41J 11/00214; B41J 2/21

See application file for complete search history.

(56) References Cited

FOREIGN PATENT DOCUMENTS

| | | | |
|---|---|---|---|
| JP | 2011025164 A | * | 2/2011 |
| JP | 2016-078252 A | | 5/2016 |

* cited by examiner

*Primary Examiner* — Justin Seo

(74) *Attorney, Agent, or Firm* — WORKMAN NYDEGGER

(57) ABSTRACT

A printing device includes a carriage configured to move in a first direction along a first axis; a head configured to eject ink onto a medium; and an irradiation section that is provided alongside the head in the first direction and that is configured to irradiate ultraviolet light toward the medium, wherein the irradiation section has a cooling unit that cools the irradiation section by airflow, in a plan view facing the medium, the head is disposed in a first region of the carriage and the irradiation section is disposed in a second region of the carriage, and in the second region, at least one lid section is provided to block an airflow from a side in which the carriage faces the medium to the irradiation section.

9 Claims, 13 Drawing Sheets

PRINTING DEVICE

The present application is based on, and claims priority from JP Application Serial Number 2022-103232, filed Jun. 28, 2022, the disclosure of which is hereby incorporated by reference herein in its entirety.

BACKGROUND

1. Technical Field

The present disclosure relates to a printing device.

2. Related Art

In the related art, a printing device that uses ink cured by ultraviolet irradiation has been known. For example, JP-A-2016-78252 discloses a printing device having an ultraviolet irradiation device. The printing device disclosed in JP-A-2016-78252 has a carriage with an inkjet head and an ultraviolet irradiation device adjacent to the carriage in the carriage movement direction. The ultraviolet irradiation device has a cooling air suction port for sucking air from outside of the ultraviolet irradiation device using a suction fan.

In the printing device in JP-A-2016-78252, airflow generated by the suction fan that is used to suck in air through the cooling air suction port, may flow near the inkjet head. In such a case, there is a possibility that the landing position of ink ejected from the inkjet head may shift due to the influence of airflow.

SUMMARY

One aspect of a printing device that solves the above problem includes a carriage configured to move in a first direction along a first axis; a head configured to eject ink onto a medium; and an irradiation section that is provided alongside the head in the first direction and that is configured to irradiate ultraviolet light toward the medium, wherein the irradiation section has a cooling unit that cools the irradiation section by airflow, in a plan view facing the medium, the head is disposed in a first region of the carriage and the irradiation section is disposed in a second region of the carriage, and in the second region, at least one lid section is provided to block airflow from a side in which the carriage faces the medium to the irradiation section.

DESCRIPTION OF EMBODIMENTS

Hereinafter, a printing device 1 according to an embodiment will be described with reference to the drawings.

1.1. Overall Configuration of Printing Device

Figure 1:
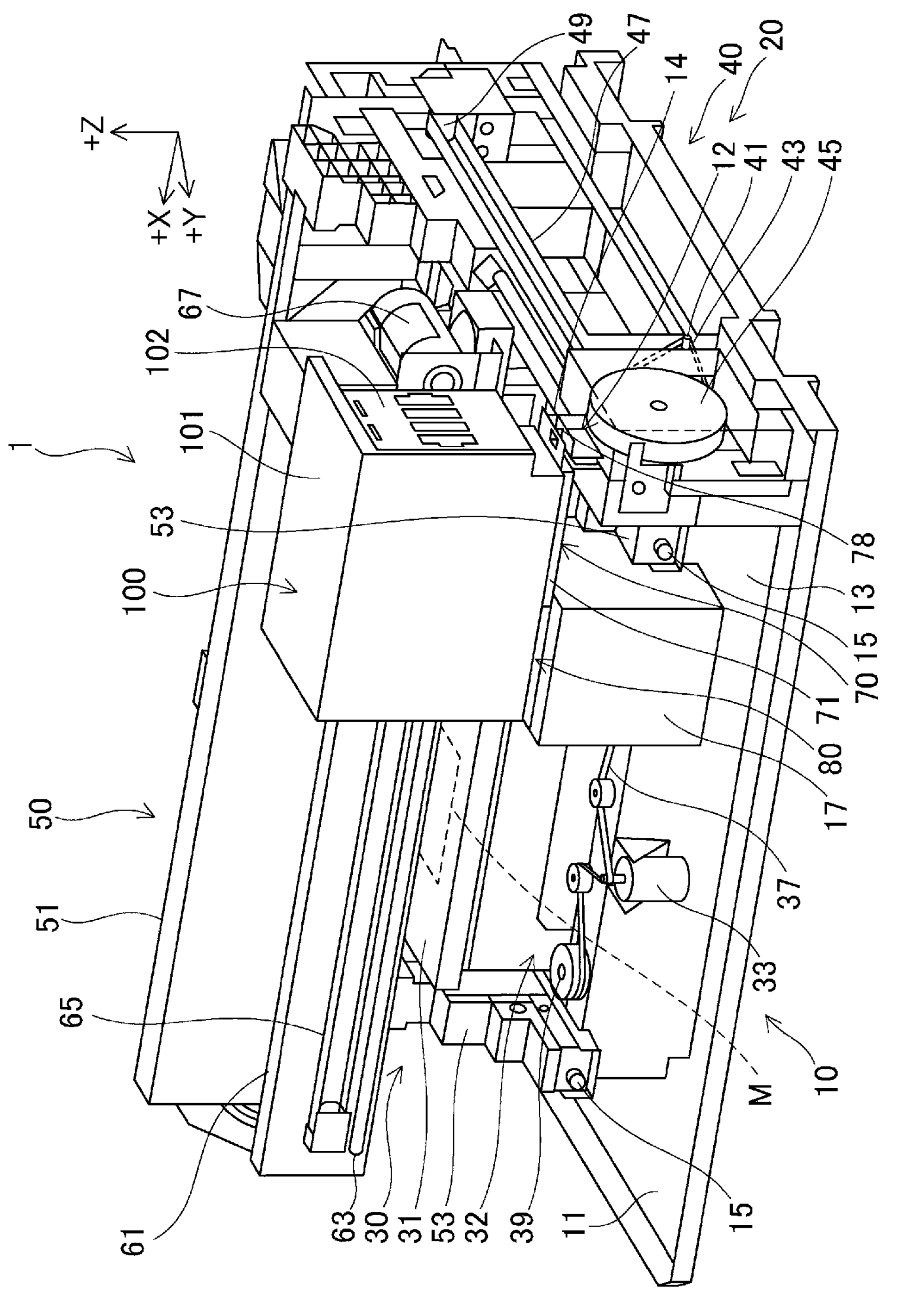
FIG. 1 is a perspective view of a printing device according to an embodiment.

FIG. 1 is a perspective view of the printing device 1. The printing device 1 shown in FIG. 1 performs printing by ejecting ink onto a medium M placed on a table 31 and curing the ink deposited on the medium M by irradiating ultraviolet light toward the medium M. The medium M is a sheet, cloth, or three dimensional object. The sheet may be paper or synthetic resin sheet. The cloth may be non-woven fabric, knitted fabric, or woven fabric. The three dimensional object may include ornamental products such as clothes and shoes, daily necessities, machine parts, and various other objects.

FIG. 1 shows an X-axis, a Y-axis, and a Z-axis. The X-axis, Y-axis, and Z-axis are orthogonal to each other. The Z-axis is an axis that extends in the up-down direction and can also be referred to as an axis that extends in the vertical direction. The X-axis and the Y-axis are parallel to the horizontal plane. In the following description, a direction along the X-axis is the left-right direction and a direction along the Y-axis is the front-back direction. Specifically, a positive direction along the Z-axis is the upward direction, a positive direction along the X-axis is the right direction, and a positive direction along the Y-axis is the forward direction. The X-axis, Y-axis, and Z-axis in FIG. 1 indicate the same direction in each of the figures described later. The X-axis corresponds to an example of a first axis, and the Y-axis corresponds to an example of a second axis. The left-right direction corresponds to an example of a first direction, and the front-back direction corresponds to an example of a second direction.

The printing device 1 has a table 31 that supports the medium M. The table 31 is a platform that does not move in the front-back direction or the left-right direction. The table 31 supports the medium M on its flat upper surface. The printing device 1 supports the medium M by the table 31 so that it does not move, and makes the carriage 100 scan above the medium M supported by the table. A head 80 and an irradiation section 70 (to be described later) are mounted on the carriage 100 aligned side by side in the left-right direction. After ink is ejected from the head 80 toward the medium M, ultraviolet light is irradiated from the irradiation section 70 onto the ink deposited to the medium M.

The printing device 1 has a main body section 10 and a movement section 50. The main body section 10 is a pedestal that is fixed to an installation surface of the printing device 1. The movement section 50 moves along the Y-axis with respect to the main body section 10.

The main body section 10 has a bottom plate 11, a base section 13, a medium support mechanism 30, and a drive mechanism 20. The bottom plate 11 is a plate-like member that is fixed to the installation surface of the printing device 1. The base section 13 is supported on the upper surface of the bottom plate 11 and supports various sections of the printing device 1. The medium support mechanism 30 has the table 31 and a height movement mechanism 32. The table 31 has a rectangular flat plate, which is the upper surface of the table, and leg sections that are located at four corners of the flat plate and that extend downward from the flat plate.

The height movement mechanism 32 has a raising/lowering motor 33, a raising/lowering belt 37, and raising/lowering mechanisms 39, and moves the table 31 in the direction along the Z-axis. The raising/lowering mechanisms 39 are provided one at each of the four leg sections of the table 31. The raising/lowering mechanism 39 have a ball screw that is located along the Z-axis, a nut that is screwed to the ball screw, and a pulley. The ball screw of the raising/lowering mechanism 39 is rotatably supported by the base section 13. The nut of the raising/lowering mechanism 39 is fixed to the leg section of the table 31. The pulley of the raising/lowering mechanism 39 is fixed to the upper portion of the ball screw. When the pulley of the raising/lowering mechanism 39 rotates, the ball screw rotates with it, and the table moves along the Z-axis along with the nut as the ball screw rotates.

The raising/lowering motor 33 is a motor that rotates according to a control of a control section 90 (to be described later). The control section 90 controls a rotation direction and a rotation amount of the raising/lowering motor 33. The raising/lowering belt 37 is an annular belt that is wound on an output shaft of the raising/lowering motor 33 and the pulleys of the four raising/lowering mechanisms 39. The raising/lowering belt 37 is driven to circulate by rotation of the raising/lowering motor 33. The raising/lowering belt 37 transmits the rotation of the raising/lowering motor 33 to the pulleys of the four raising/lowering mechanisms 39. This causes the ball screws in the raising/lowering mechanisms 39 to rotate, and moves the table 31 along the Z-axis.

The rotation direction of the raising/lowering motor 33 can be switched between a forward direction in which the table 31 is moved upward and a reverse direction in which the table 31 is moved downward. The printing device 1 raises and lowers the table 31 by operating the raising/lowering motor 33.

By changing the height of the table 31 in this manner, the printing device 1 adjusts a distance between the nozzles 83 of the head 80 and the medium M (to be described later), to be an optimum distance for printing.

The drive mechanism 20 has a pair of guide shafts 15 and a frame drive section 40. The pair of guide shafts 15 are shaft-like members that are hung over the pair of base sections 13 and are located along the Y-axis.

The movement section 50 has a main frame 51 and a pair of frame leg sections 53.

The main frame 51 is a plate-shaped member that is elongated in the direction along the X-axis. The pair of frame leg sections 53 are supported by the pair of guide shafts 15 and are both movable in the front-back direction. The main frame 51 is fixed on the pair of frame leg sections 53 and is supported from below by the pair of frame legs 53. The main frame 51, together with the pair of frame leg sections 53, is guided by the guide shafts 15 and moves along the Y-axis.

The frame drive section 40 has a frame movement motor 41, a transmission belt 43, a speed change mechanism 45, and a transmission belt 47.

The frame movement motor 41 is a motor that rotates according to the control of the control section 90 (to be described later). The transmission belt 43 is an annular belt, which is wound between the output shaft of the frame movement motor 41 and the speed change mechanism 45, and transmits the drive force of the frame movement motor 41 to the speed change mechanism 45. The speed change mechanism 45 has a first pulley and a second pulley. The transmission belt 43 is wound around the first pulley and the transmission belt 47 is wound around the second pulley. The speed change mechanism 45 drives the transmission belt 47 by rotating the second pulley with a drive force transmitted from the transmission belt 43 to the first pulley. The speed change mechanism 45 transmits the drive force of the frame movement motor 41 to the transmission belt 47 at a reduction ratio corresponding to the ratio of the diameters of the first pulley and the second pulley.

The transmission belt 47 is an annular belt that is wound on the speed change mechanism 45 and a pulley 49, which is located at an end portion of the base section 13 in the −Y direction. The pulley 49 is rotatably installed with respect to the base section 13. The transmission belt 47 is located along the Y-axis. The frame leg sections 53 are fixed to the transmission belt 47. Therefore, the drive force to move the frame leg section 53 along the Y-axis is exerted by the circulation drive of the transmission belt 47. As a result, the movement section 50 moves along the Y-axis.

The rotation direction of the frame movement motor 41 can be switched between the forward direction in which the main frame 51 is moved in the +Y direction and the reverse direction in which the main frame 51 is moved in the −Y direction. The printing device 1 moves the main frame 51 forward and backward by operating the frame movement motor 41.

A carriage support frame 61, a carriage guide shaft 63, a carriage drive motor 67, and the carriage 100 are located on the main frame 51. The carriage 100 includes the irradiation section 70 and the head 80 (to be described later).

The carriage support frame 61 is a plate-shaped member that is elongated in the direction along the X-axis. A carriage guide shaft 63 is fixed to the carriage support frame 61 along the X-axis. The carriage 100 is supported by the carriage support frame 61 and the carriage guide shaft 63, and can move along the carriage guide shaft 63. In the range where the carriage 100 can move along the X-axis, the leftmost position is a home position. The main body section 10 has a cleaner 17 at the home position that performs maintenance such as flushing and cleaning of the head 80. In FIG. 1, the carriage 100 is at the home position.

The carriage drive motor 67 is a motor that rotates according to the control of the control section 90 (to be described later). The rotation of the carriage drive motor 67 is transmitted to the carriage drive belt 65, and the carriage drive belt 65 is driven to circulate.

The carriage drive belt 65 is an annular belt that is wound along the X-axis direction with respect to the carriage support frame 61. The carriage drive belt 65 is connected to the carriage 100. Therefore, when the carriage drive belt 65 is driven to circulate, the carriage 100 moves along the X-axis. When the main frame 51 moves along the Y-axis, the carriage 100 moves in the front-back direction, that is, in the +Y direction and the −Y direction. Therefore, the printing device 1 can move the carriage 100 in the front-back direction and the left-right direction.

By moving the head 80 mounted on the carriage 100 in the front-back direction and the left-right direction with respect to the table 31, the printing device 1 performs printing by ejecting ink onto the entire medium M supported by the table 31. The printing device 1 moves the irradiation section 70 mounted on the carriage 100 in the front-back direction and the left-right direction, and irradiates ultraviolet light onto the ink deposited on the medium M.

Figure 2:
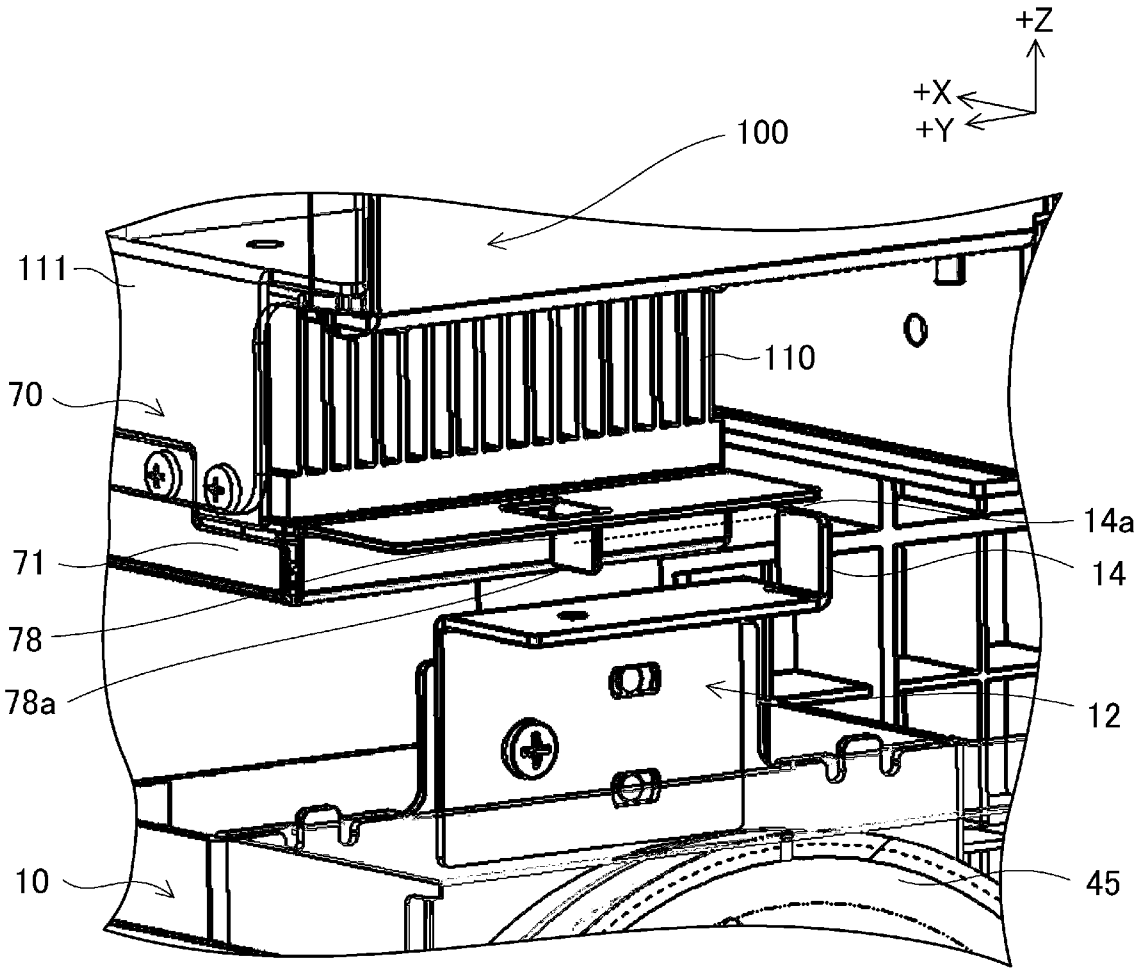
FIG. 2 is a perspective view of a main part of the printing device according to the embodiment.

FIG. 2 is a perspective view of a main part of the printing device 1, showing a configuration of a first contact portion 78 and its vicinity when the carriage 100 is in the home position. The irradiation section 70 has the first contact portion 78. The first contact portion 78 is a plate-shaped protrusion that protrudes downward. The first contact portion 78 is formed by bending downward a −X direction end portion of a housing 71, which is an outer casing member covering a lower part of the irradiation section 70. The housing 71 is formed by bending sheet metal. A second contact portion 14 is a plate-shaped protrusion that protrudes upward. The second contact portion 14 is formed by bending upward a contact member 12, which is located at an end portion of the main body section 10 in the −X direction. The contact member 12 is a member formed by bending sheet metal and is fixed to the main body section 10 with screws. The contact member 12 is located diagonally forward to the right of the table 31, and does not overlap the table 31 in the front-back direction nor in the left-right direction. Therefore, the second contact portion 14 is located near the front end portion of the main body section 10.

The first contact portion 78 and the second contact portion 14 are perpendicular to the Y-axis. The upper end portion 14*a* of the second contact portion 14 is located above the lower end portion 78*a* of the first contact portion 78. Further, as shown in FIG. 1 and FIG. 2, when the carriage 100 is in the home position, the first contact portion 78 of the irradiation section 70 and the second contact portion 14 of the main body section 10 overlap in the X-axis. In other words, when the carriage 100 is in the home position, the first contact portion 78 and the second contact portion 14 partially overlap each other in the front-back direction. Therefore, when the movement section 50 moves in the front-back direction while the carriage 100 is in the home position, the carriage 100 also moves in the front-back direction, and the first contact portion 78 and the second contact portion 14 contact each other.

1.2. Configuration of Carriage

Figure 3:
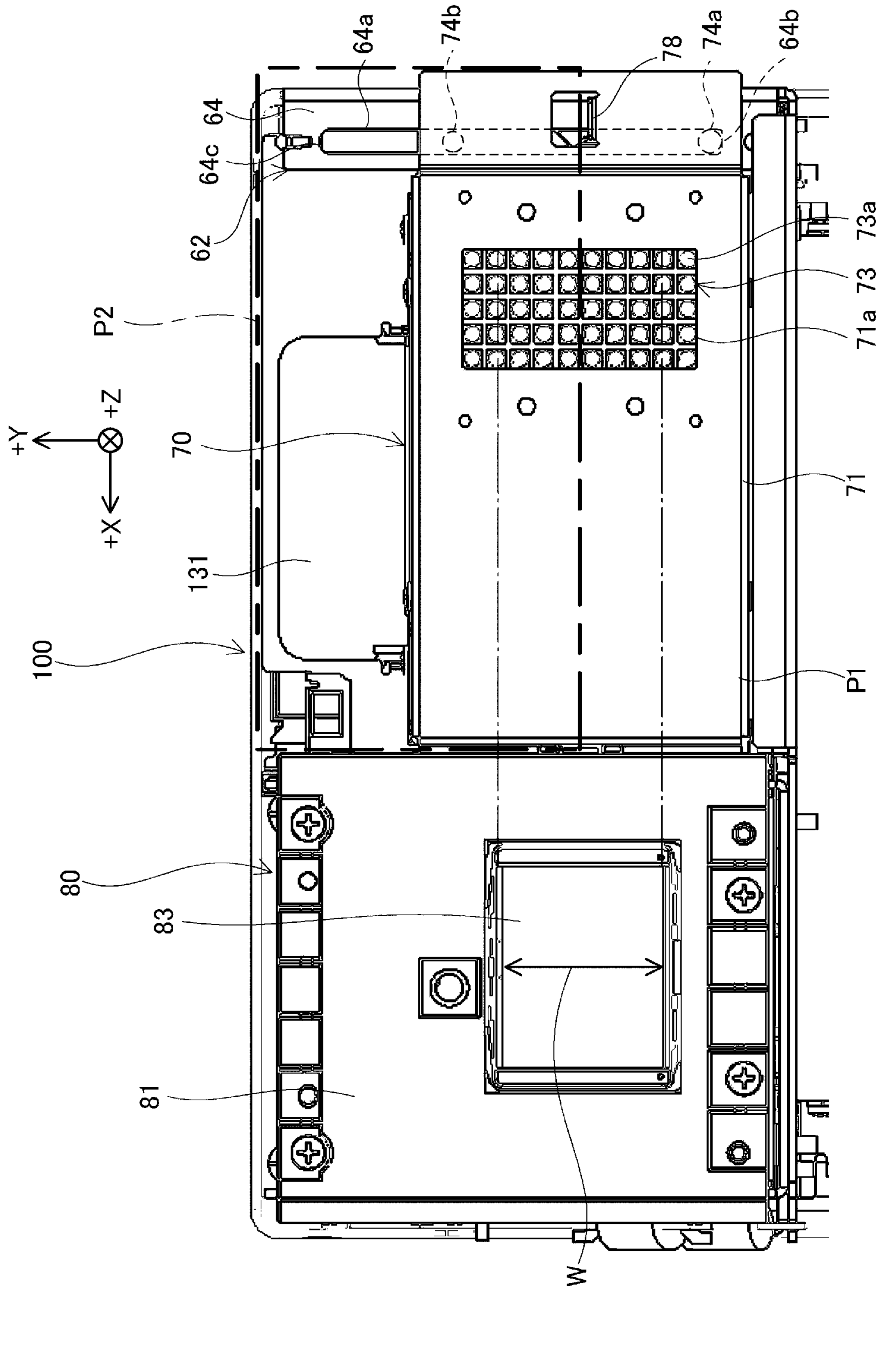
FIG. 3 is a plan view of a carriage according to the embodiment.
Figure 4:
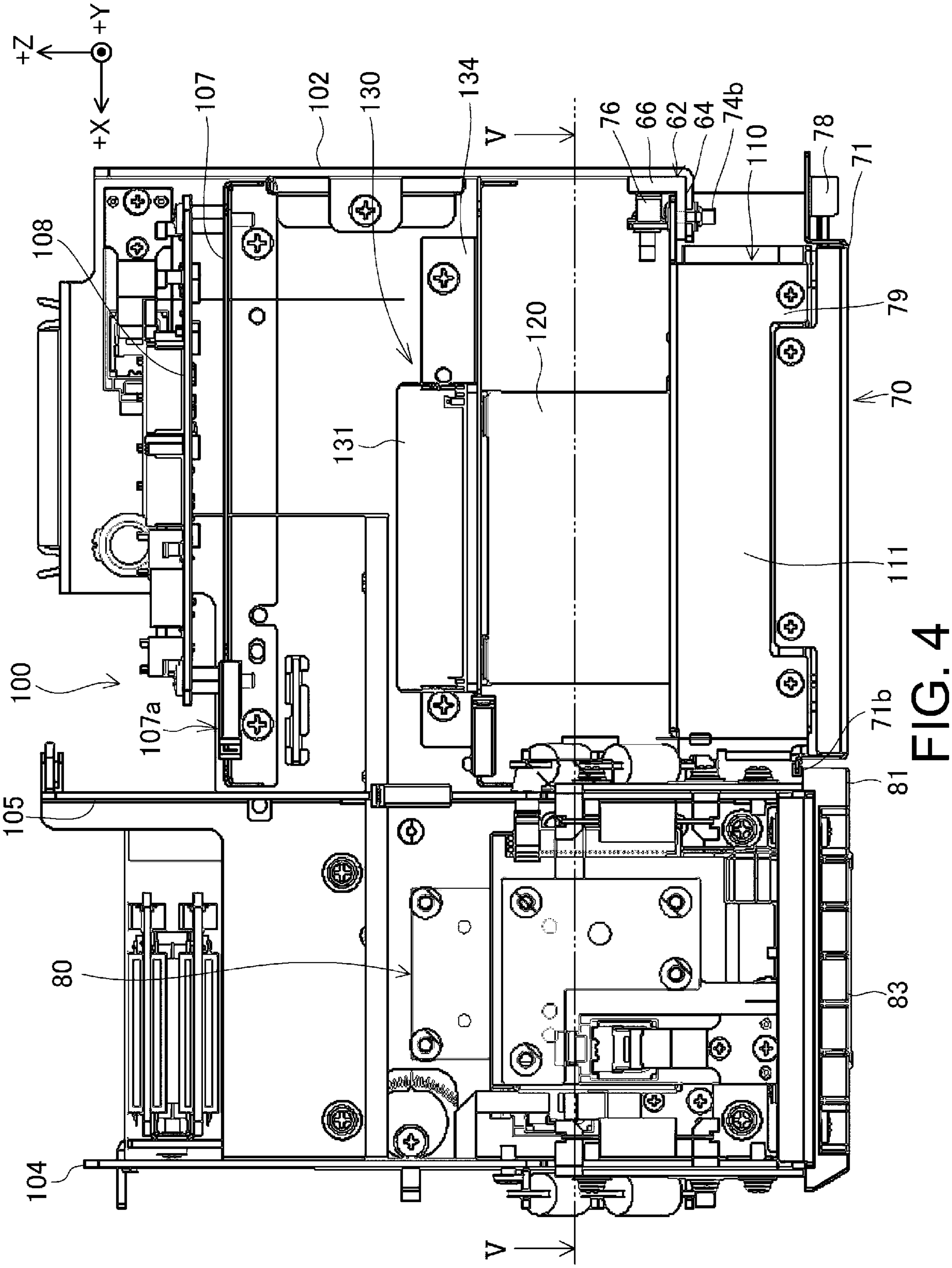
FIG. 4 is a side view of the carriage according to the embodiment.
Figure 5:
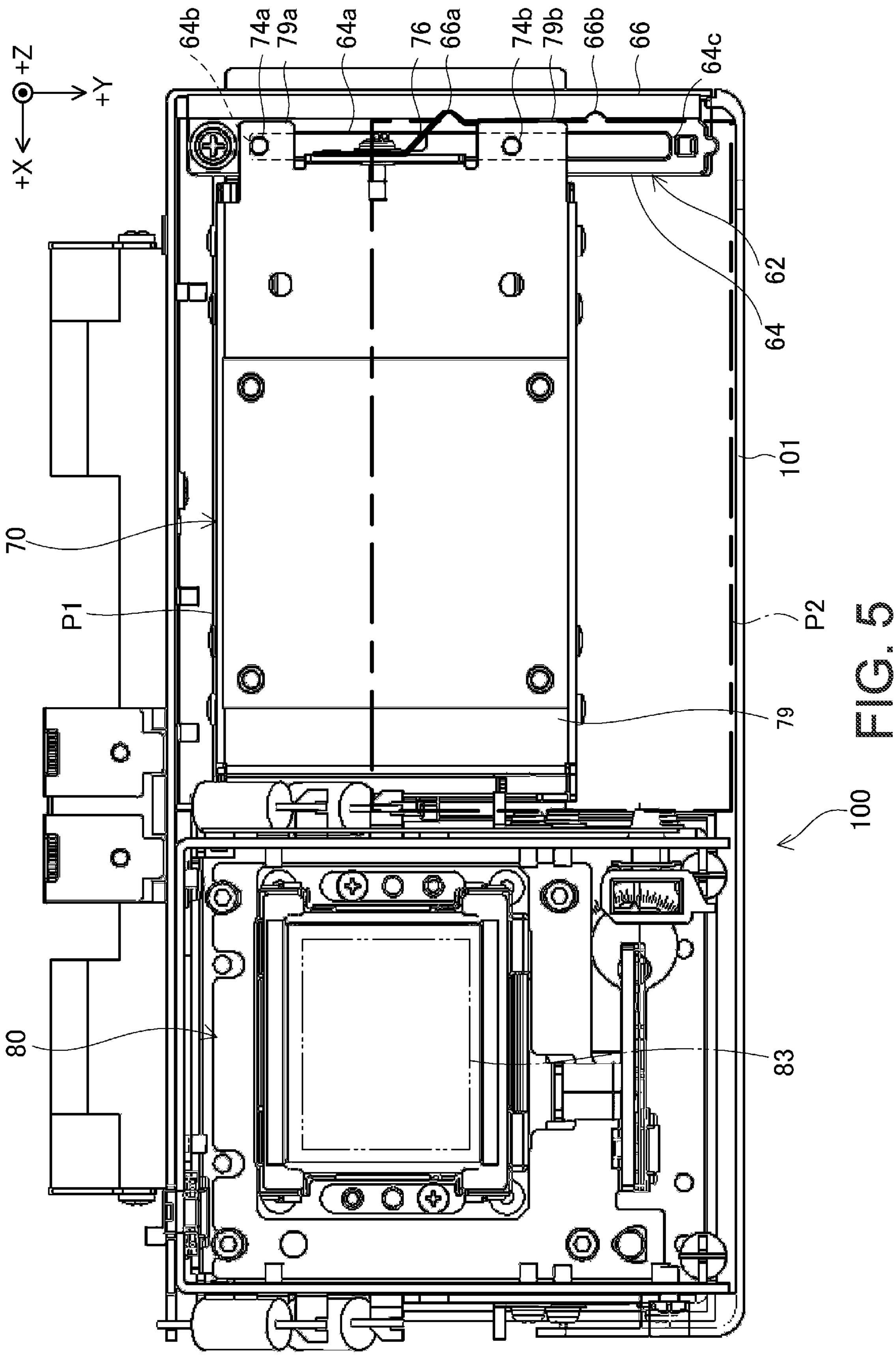
FIG. 5 is a V-V cross-sectional view in FIG. 4.

FIG. 3 is a plan view of the carriage 100 as viewed from below. FIG. 4 is a side view of the carriage 100 as viewed from the front. FIG. 5 is a V-V cross-sectional view of FIG. 4. For convenience of explanation, FIG. 4 shows a state in which an outer casing of the carriage 100 is removed.

The carriage 100 has the head 80, the irradiation section 70, and a guide 62. The head 80 and the irradiation section 70 are mounted on the carriage 100 and are aligned side by side in the left-right direction.

The head 80 is a device that ejects ink by driving a piezo actuator (not shown). The head 80 is located on the right side of the carriage 100 by being fixed to the outer casing of the carriage 100. A bottom panel 81 is provided below the head 80. The bottom panel 81 is a substantially rectangular plate that is provided horizontally and has a rectangular opening in the center, as shown in FIG. 3. Nozzles 83 provided in the head 80 are exposed through the opening in the bottom panel 81. The nozzles 83 are a number of microscopic holes, which open downward, and ink is ejected from the holes to be deposited on the medium M.

As shown in FIG. 3 to FIG. 5, the guide 62 is a member that is fixed to the outer casing of the carriage 100, with its longitudinal direction being the front-back direction. The guide 62 is located at the left end portion of the carriage 100. As shown in FIG. 4, the guide 62 is an L-shaped member in front view, and it includes a horizontal and plate-shaped guide section 64 and a plate-shaped holding section 66, which rises vertically from a −X direction end portion of the guide section 64.

The guide section 64 has a guide hole 64*a*, which is a substantially rectangular and extends in the front-back direction. As shown in FIG. 5, a first recess 66*a* and a second recess 66*b*, both of which are recesses with a concave shape in the −X direction, are formed in the +X direction side surface of the holding section 66. The first recess 66*a* is formed near the center of the holding section 66, and the second recess 66*b* is formed more forward than the first recess 66*a*.

The irradiation section 70 is located on the −X direction side of the carriage 100. As shown in FIG. 4, the irradiation section 70 has a case 79, which is an outer casing member covering an upper portion of the irradiation section 70, and a housing 71, which is an outer casing member covering a lower portion of the irradiation section 70.

The irradiation section 70 has an irradiation port 71*a* facing downward. The irradiation port 71*a* is a rectangular-shaped opening formed in the housing 71. The irradiation port 71*a* is covered by a plate glass from the inside of the housing 71. Ultraviolet light emitted from a UV light source 73, which is located inside the housing 71, is irradiated through the plate glass and the irradiation port 71*a* to the medium M placed below the housing 71. The UV light source 73 is formed by light emitting elements 73*a*, which emit ultraviolet light, that are arranged in the X-axis direction and the Y-axis direction. The light emitting elements 73*a* are, for example, ultraviolet light emitting diodes (UV-LED).

As shown in FIG. 4 and FIG. 5, a first protrusion 79*a* and a second protrusion 79*b* are formed at the left end portion of the case 79. Both the first protrusion 79*a* and the second protrusion 79*b* protrude in the left direction. The first protrusion 79*a* has a first guide pin 74*a* protruding downward. The second protrusion 79*b* has a second guide pin 74*b* protruding downward. The first guide pin 74*a* and the second guide pin 74*b* may be referred to as "guide pins". The first guide pin 74*a* and the second guide pin 74*b* are cylindrical-shaped pins and are aligned in the front-back direction. Both the first guide pin 74*a* and the second guide pin 74*b* fit into the guide hole 64*a* of the guide 62. Therefore, the left end portion of the irradiation section 70 is supported by the guide 62 so that it can be moved relative to the carriage 100 in the front-back direction.

As shown in FIG. 4, a slide member 71*b* is provided at a right end portion of the housing 71. The slide member 71*b* is a member attached to an edge portion of the right end portion of the housing 71. The slide member 71*b* bulges downward from the edge portion of the right end portion. The slide member 71*b* contacts the left end portion of the upper surface of the bottom panel 81 of the head 80 from above. Accordingly, the right end portion of the irradiation section 70 is supported by the bottom panel 81 so that it can be moved relative to the carriage 100 in the front-back direction.

Therefore, the irradiation section 70 is supported by the guide 62 and the bottom panel 81 so that it can be moved relative to the head 80 in the front-back direction.

As shown in FIG. 5, a plate spring 76 is fixed to a left end portion of the case 79. The plate spring 76 is a compression spring that is placed between the left end portion of the case 79 and the holding section 66, and deflects in the left-right direction. The plate spring 76 is formed by bending it to fit into the first recess 66*a* or the second recess 66*b*. The plate spring 76 fits into the first recess 66*a* or the second recess 66*b* to hold the irradiation section 70 from moving relative to the head 80.

FIG. 3 to FIG. 5 show the carriage 100 when the plate spring 76 is fitted into the first recess 66*a*. The relative position of the irradiation section 70 to the head 80 in this state is defined as a first relative position P1. When the irradiation section 70 is in the first relative position P1, as shown in FIG. 3 all the nozzles 83 of the head 80 overlap the irradiation port 71*a* in the Y-axis. When the irradiation section 70 is in the first relative position P1, the first guide pin 74*a* contacts a first contact surface 64*b*, which is a rear end portion of the guide hole 64*a*. The first relative position P1 corresponds to an example of a first position.

Figure 6:
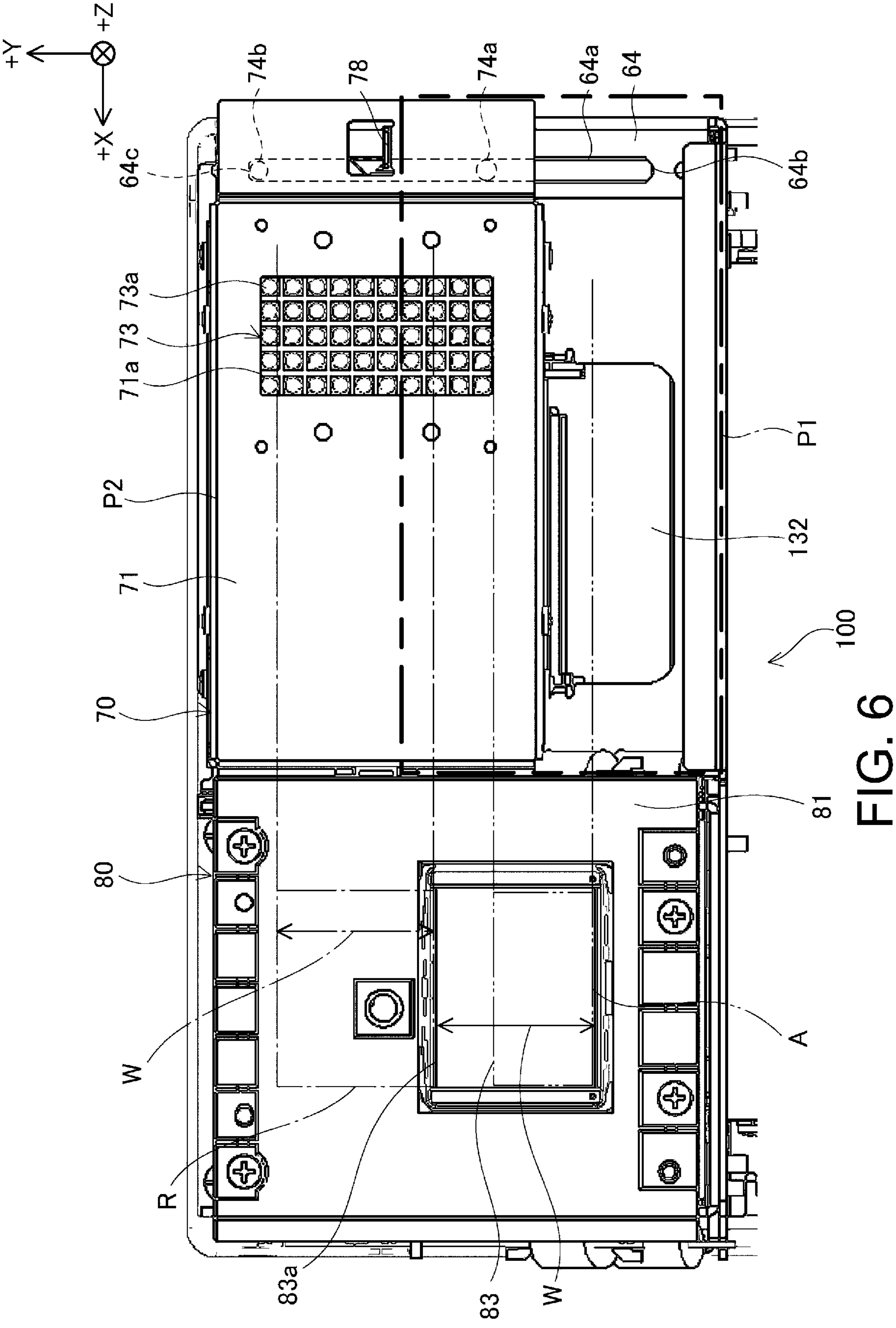
FIG. 6 is a plan view of the carriage according to the embodiment.

FIG. 6 is a plan view of the carriage 100, showing the carriage 100 viewed from below in a state where the plate spring 76 is fitted into the second recess 66*b*. The relative position of the irradiation section 70 to the head 80 in the state shown in FIG. 6 is defined as a second relative position P2. When the irradiation section 70 is in the second relative position P2, the irradiation port 71*a* does not overlap, in the Y-axis, with part A of the nozzles 83, which is indicated by an imaginary line. However, when the irradiation section 70 is in the second relative position P2, the irradiation port 71*a* overlaps the entirety of a range R in the Y-axis. Here, the range R is a range from the front end portion 83*a* of the nozzles 83 to a location that is a distance W forward. The distance W is equal to the dimension of the nozzles 83 in the front-back direction. The second relative position P2 corresponds to an example of a second position. When the irradiation section 70 is in the second relative position P2, the second guide pin 74*b* contacts a second contact surface 64*c*, which is the front end portion of the guide hole 64*a*. The first contact surface 64*b* and the second contact surface 64*c* may be referred to as "contact surfaces".

When the printing device 1 performs the printing operation, the time from when ink is ejected through the nozzles 83 onto the medium M to when the ultraviolet light is irradiated from the irradiation port 71 onto the ink deposited on the medium M affects the finish of the printed matter. This time is tentatively called a pre-irradiation time. If the pre-irradiation time is long, the ink deposited to the surface of the medium M becomes smooth on the surface of the medium M before it is cured by irradiation of the ultraviolet light. Therefore, longer the pre-irradiation time, the stronger the gloss of the printed area. On the other hand, if the pre-irradiation time is short, the ink deposited to the surface of the medium M is cured in a condition where it is not sufficiently smooth. Therefore, if the pre-irradiation time is short, the remaining unevenness on the surface of the ink is fixed, and the gloss will be weak. The pre-irradiation time varies depending on the positional relationship between the nozzles 83 and the irradiation port 71*a*. When the printing device 1 performs printing while the irradiation section 70 is in the first relative position P1, the printed material will have a matte tone finish with a low gloss because the pre-irradiation time is short. In other words, the printing device 1 performs matte tone printing by positioning the irradiation section 70 at the first relative position P1. The printing device 1 performs glossy tone printing with a strong gloss by performing printing while the irradiation section 70 is in the second relative position P2. Details of a printing operation of the printing device 1 will be described later.

1.3. Cooling Structure of Irradiation Section

The irradiation section 70 has a cooling structure that dissipates the heat generated by the UV light source 73 by turning on the light emitting element 73*a*. This cooling structure has a heatsink 110 attached to the housing 71 of the irradiation section 70, and a fan unit 120 that blows a cooling airflow to the heatsink 110. The fan unit 120 corresponds to an example of a cooling unit. The cooling unit may include the heatsink 110 and the fan unit 120.

Figure 7:
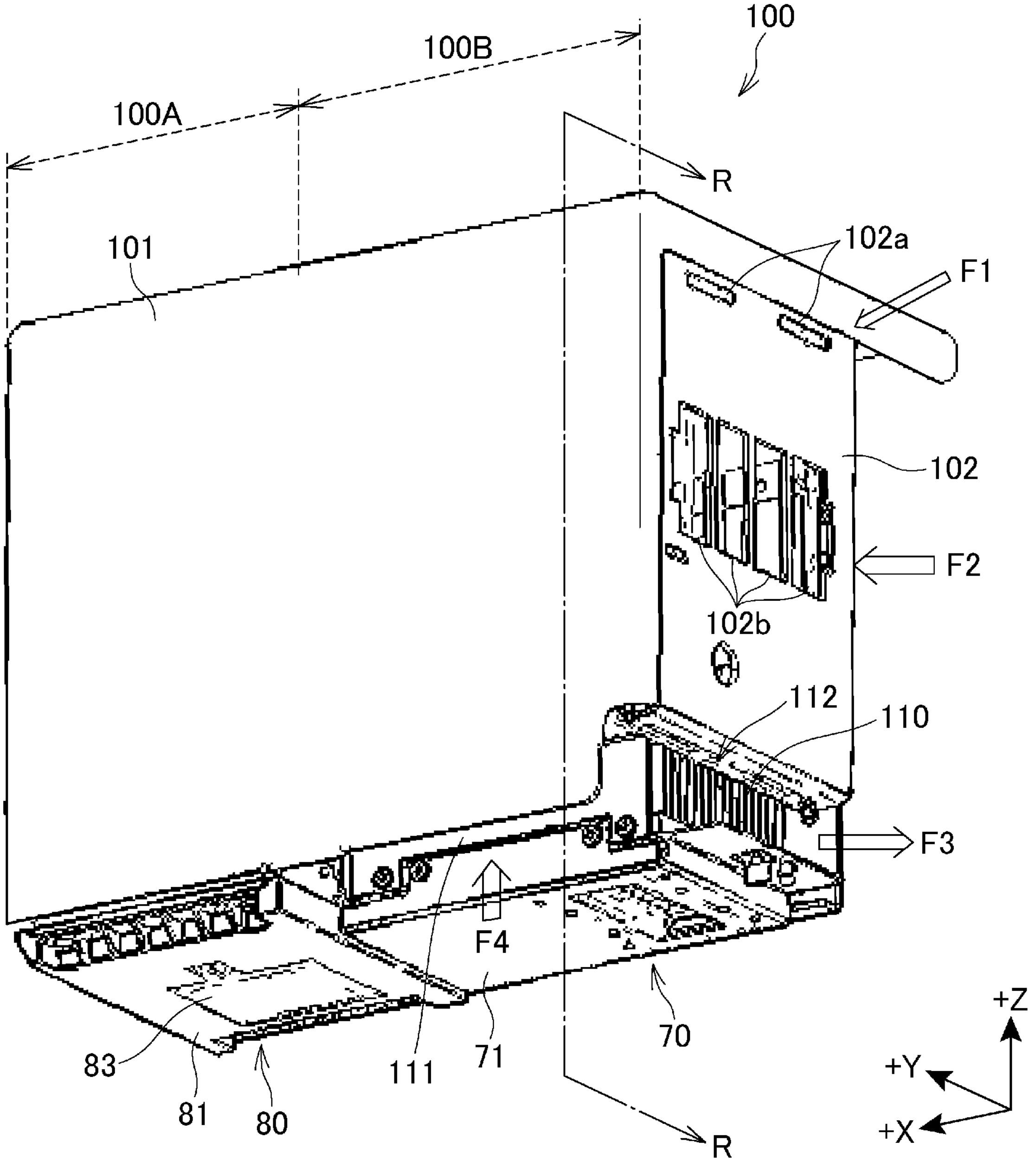
FIG. 7 is a perspective view of the carriage according to the embodiment.

FIG. 7 is a perspective view of the carriage 100 according to the embodiment, showing the carriage 100 viewed from below. As described above, the irradiation section 70 and the head 80 are arranged side by side in the +X direction on the bottom surface of the carriage 100. An upper portion of the carriage 100 is covered by the outer casing, which includes a carriage cover 101 and an air intake port cover 102.

Figure 8:
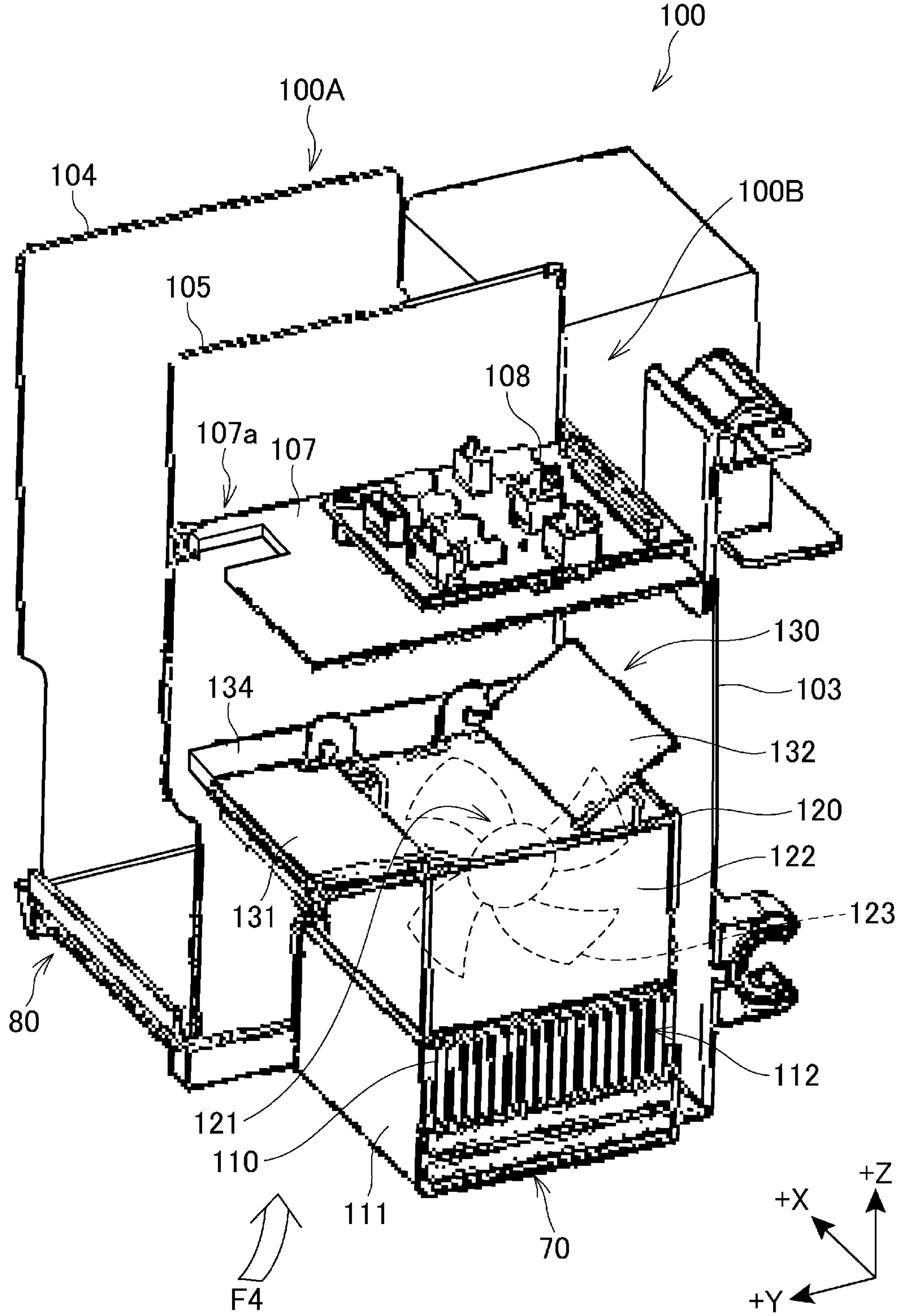
FIG. 8 is a R-R cross-sectional view in FIG. 7.

FIG. 8 is an R-R cross-sectional view in FIG. 7, showing the configuration without the carriage cover 101. As shown in FIG. 7 and FIG. 8, the heatsink 110 is placed on the housing 71 of the irradiation section 70, overlapping the irradiation section. The heatsink 110, for example, is a metallic member having a plurality of fins, and is fixed in close contact with the circuit substrate of the UV light source 73 or the housing 71. The heat generated by the irradiation section 70 is transferred to the heatsink 110, and the heatsink 110 dissipates the heat into the air through its fins. Side surfaces of the heatsink 110 in the +Y direction and the −Y direction 110 are covered by a heatsink cover 111. The side surfaces of the heatsink 110 in the +X direction, the +Y direction and the −Y direction are covered by the heatsink cover 111, and the side surface of the heatsink 110 in the −X direction is opened to form an air exhaust section 112.

The fan unit 120 is placed on the heatsink 110. The fan unit 120 has a fan case 122 and a fan 123 located inside the fan case 122. The fan case 122 covers side surfaces of the fan 123, and a bottom surface of the fan case 122 is joined to the heatsink cover 111. The upper surface of the fan case 122 is open, hereinafter referred to as a top opening 121.

The fan 123 is a fan that blows air downward from above, that is, in the −Z direction, and is, for example, an axial flow fan. An upper surface of the fan case 122 is an air intake port that draws in air, and the airflow generated by the fan case 122 goes downward inside the heatsink cover 111 and takes heat away from the heatsink 110. The fan case 122 covers side surfaces of the fan 123 in the +X direction, −X direction, +Y direction and −Y direction, so the airflow generated by the fan 123 is restricted to being in the direction from the top opening 121 of the fan case 122 to the bottom surface.

In the heatsink 110, the surfaces covered by the heatsink cover 111 do not allow air to circulate, so the airflow blown by the fan 123 toward the heatsink 110 is exhausted from the air exhaust section 112.

As shown in FIG. 8, the carriage 100 has a cover 103 covering the −Y side surface of the carriage 100 and a cover 104 covering the +X side surface of the carriage 100, in addition to the carriage cover 101 and the air intake port cover 102. In this way, the inside of the carriage 100 becomes a space surrounded by the outer casing composed of the carriage cover 101, the air intake port cover 102, the cover 103 and the cover 104.

As shown in FIG. 7 and FIG. 8, the interior space of the carriage 100 is divided into a first region 100A and a second region 100B. The first region 100A is located on the +X side of the carriage 100 in plan view, and the second region 100B is located on the −X side of the carriage 100 in plan view. An internal partition wall 105 is located inside the carriage 100, which separates the first region 100A from the second region 100B. The head 80 and a circuit substrate (not shown) on which a drive circuit of the head 80 is mounted are located in the first region 100A. The irradiation section 70 including the heatsink 110 and the fan unit 120 is located in the second region 100B.

A substrate support section 107 is located in the second region 100B. The substrate support section 107 is a plate-shaped member fixed to the internal partition wall 105 and supports a circuit substrate 108 on which a circuit that turns on the UV light source 73 is mounted. A ventilation opening 107*a* is provided in the substrate support section 107. Through the ventilation opening 107*a*, air can be circulated in the up-down direction of the substrate support section 107.

The air intake port cover 102 has upper air intake ports 102*a* and lower air intake ports 102*b*. The upper air intake ports 102*a* and the lower air intake ports 102*b* are holes passing through the air intake port cover 102. The upper air intake ports 102*a* are located above the substrate support section 107. The lower air intake ports 102*b* are located between the substrate support section 107 and the fan unit 120 in the +Z direction. When the fan 123 is operated, air flows into the second region 100B from the lower air intake ports 102*b* as indicated by the symbol F2 and it flows toward the fan unit 120. In addition, the operation of the fan 123 also causes air to flow into the second region 100B from the upper air intake ports 102*a*, as indicated by the symbol F1. This airflow cools the circuit substrate 108 and flows through the ventilation opening 107*a* toward the fan unit 120. The fan unit 120 blows air toward the heatsink 110, and the airflow sent by the fan unit 120 is exhausted from the air exhaust section 112 of the heatsink 110, as indicated by the symbol F3. The upper air intake ports 102*a* and the lower air intake ports 102*b* correspond to an example of an opening.

Thus, the airflow to cool the irradiation section 70 of the carriage 100 is drawn in from the side surface of the carriage 100 in the −X direction and exhausted from the same surface.

By the fan unit 120 sucking air, an airflow from the bottom surface of the carriage 100 to the upper surface of the fan unit 120 may be generated, as indicated by the symbol F4 in FIG. 8. The airflow F4 causes an airflow between the head 80 and the medium M. This airflow affects the print quality of the printing device 1. Specifically, the temperature of the head 80 is lowered by the airflow flowing in the vicinity of the head 80. This may cause the temperature of the ink ejected from the nozzles 83 to drop, which increases the viscosity of the ink, and may cause misalignment of the landing position of the ink ejected from the nozzles 83 onto the medium M. Further, the trajectory of the ink ejected from the nozzles 83 may be disturbed by the airflow.

The printing device 1 has a lid section 130 to suppress or prevent the generation of the airflow F4. In the second region 100B, the lid section 130 blocks the airflow F4, which flows from below the carriage 100 to the top opening 121 of the fan unit 120.

As described above, the irradiation section 70 is movable relative to the head 80 in the +Y direction, and can move between the first relative position P1 and the second relative position P2. The position of the airflow F4 changes when the irradiation section 70 is in the first relative position P1 or in the second relative position P2. For example, FIG. 8 shows the irradiation section 70 in the first relative position P1. In this state, the airflow F4 flows between the carriage cover 101 (not shown) and the heatsink cover 111. In contrast, when the irradiation section 70 moves to the second relative position P2, the airflow F4 flows between the cover 103 and the heatsink cover 111.

The lid section 130 has a first lid section 131 and a second lid section 132. The first lid section 131 is located further in the +Y direction than is the second lid section 132. The first lid section 131 is located between the carriage cover 101 and the heatsink cover 111, and blocks the airflow F4 when the irradiation section 70 is in the first relative position P1. The second lid section 132 is located between the cover 103 and the heatsink cover 111, and blocks the airflow F4 when the irradiation section 70 is in the second relative position P2.

Figure 9:
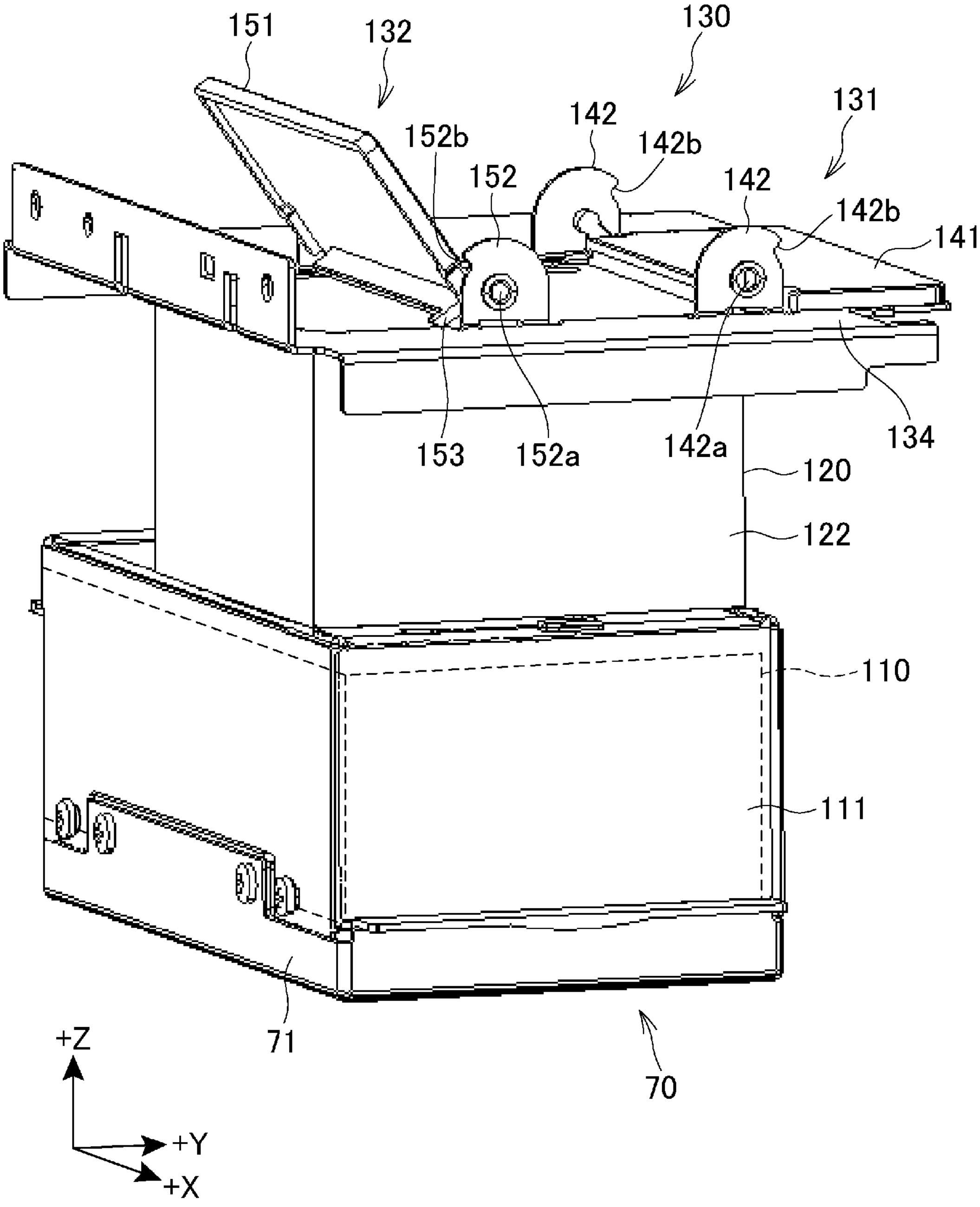
FIG. 9 is a perspective view of an irradiation section and a lid section according to the embodiment.
Figure 10:
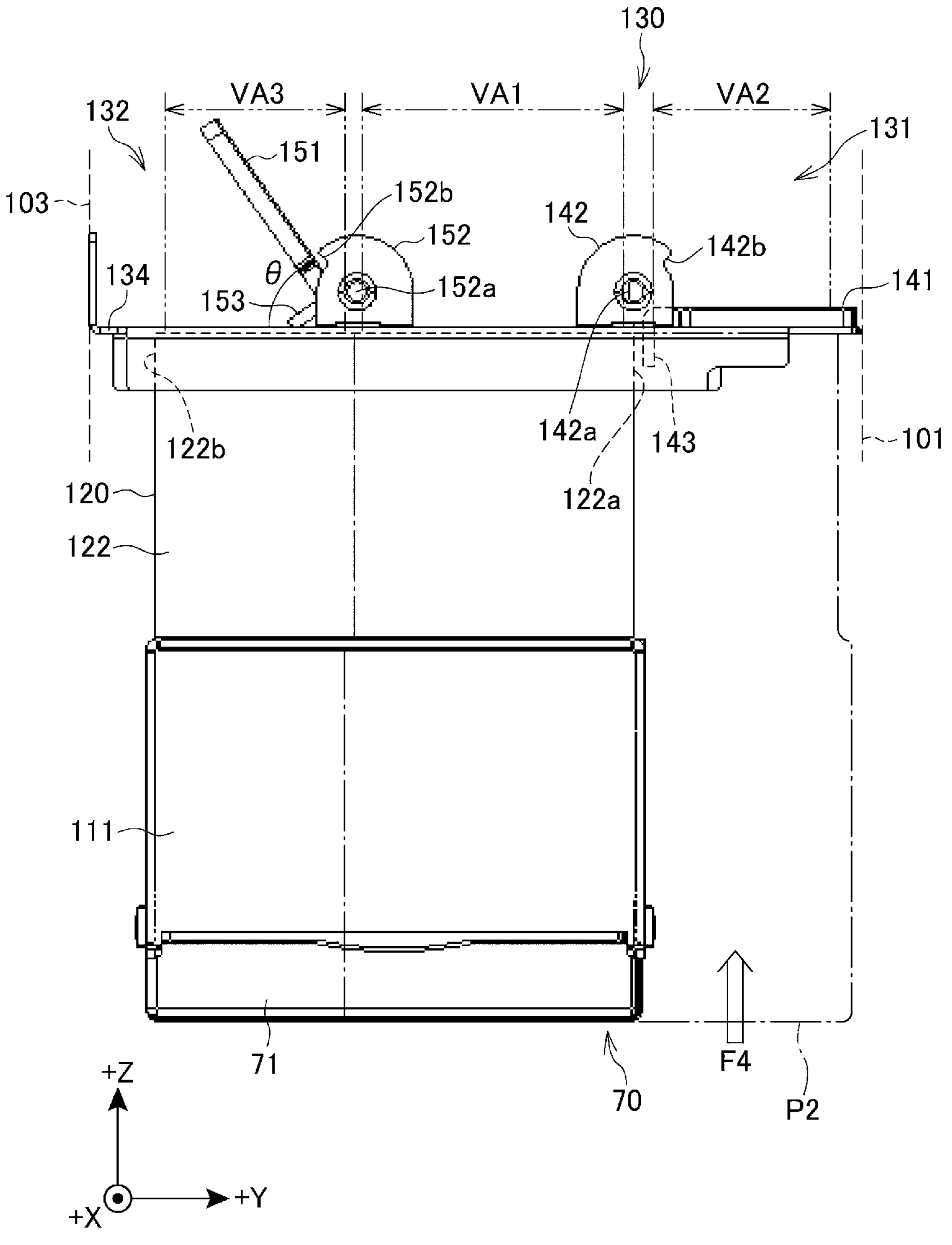
FIG. 10 is a side view of the irradiation section and the lid section according to the embodiment.

FIG. 9 is a perspective view of the irradiation section 70 and the lid section 130 according to the embodiment. FIG. 10 is a side view of the irradiation section 70 and the lid section 130 according to the embodiment. The first lid section 131 has a first lid body 141 that is flat plate-shaped, a first support section 142 that pivotably supports the first lid body 141, and a first protruding section 143 that protrudes from the first lid body 141. The second lid section 132 has a second lid body 151 that is flat plate-shaped, a second support section 152 that pivotably supports the second lid body 151, and a second protruding section 153 that protrudes from the second lid body 151.

FIG. 9 and FIG. 10 shows the state in which the irradiation section 70 is in the first relative position P1. In this state, the second lid body 151 is raised, so the fan unit 120 can suck air downward from the region of the top opening 121 that overlaps the second lid body 151. In addition, when the irradiation section 70 moves from the first relative position P1 to the second relative position P2, the second lid body 151 pivots downward to become substantially horizontal, while the first lid body 141 pivots upward. Therefore, in the second relative position P2, the fan unit 120 can suck in air from the region of the top opening 121 that overlaps the first lid body 141.

FIG. 10 shows regions VA1, VA2, and VA3 through which the fan unit 120 sucks in air. The upper surface of the fan unit 120 is almost entirely the top opening 121. When the irradiation section 70 is in the first relative position P1, the top opening 121 overlaps the region VA3, which overlaps the second lid body 151, and the region VA1, which is between the first lid section 131 and the second lid section 132. As shown in FIG. 10, in the state where the second lid body 151 is pivoted diagonally upward, the fan unit 120 can suck in air from the regions VA1 and VA3. In this state, the first lid body 141 is substantially horizontal, and the space between the irradiation section 70 and the carriage cover 101 is almost closed by the first lid body 141, so the airflow F4 is blocked by the first lid body 141.

When the irradiation section 70 is in the second relative position P2, the top opening 121 overlaps the region VA2, which overlaps the first lid body 141, and the region VA1. In this case, the first lid body 141 is pivoted diagonally upward, the fan unit 120 can suck in air from the regions VA1 and VA2. Further, in this state, the second lid body 151 is substantially horizontal, and the space between the irradiation section 70 and the cover 103 is closed almost entirely by the second lid body 151, so the airflow F4 is blocked by the second lid body 151.

The first lid body 141 and the second lid body 151 open and close in accordance with movement of the irradiation section 70. In the second lid section 132, when the second lid body 151 is closed, a tip portion of the second lid body 151 is in contact with or close to the cover 103. A base end portion of the second lid body 151 is fixed to a hinge 152*a* of the second support section 152. The second support section 152 pivotably supports the second lid body 151 by the hinge 152*a*. The second protruding section 153 protrudes from the base end portion of the second lid body 151 toward the fan unit 120. The second protruding section 153 overlaps an upper end portion of the fan case 122, that is, a case upper end 122*b*, in the +Z direction. Therefore, when the irradiation section 70 moves from the second relative position P2 to the first relative position P1, the case upper end 122*b* collides with the second protruding section 153, and pushes the second protruding section 153 to the −Y direction. As a result, the second protruding section 153 pivots with the second lid body 151 around the hinge 152*a*, and causes the second lid body 151 to open upward.

A contact surface 152*b* is formed on the second support section 152. The contact surface 152*b* is formed, for example, by cutting a notch in part of the second support section 152. The contact surface 152*b* is a surface that contacts the second lid body 151 when the second lid body 151 is pivoted upward by a predetermined angle. When the second lid body 151 is pivoted by the second protruding section 153 being pushed by the case upper end 122*b*, the pivoting of the second lid body 151 is restricted where the second lid body 151 contacts the contact surface 152*b*. Therefore, an angle θ at which the second lid body 151 opens upward does not exceed 90 degrees. When the irradiation section 70 moves from the first relative position P1 to the second relative position P2, the second lid body 151 pivots downward by its own weight to block the airflow F4 because the second protruding section 153 is no longer supported by the case upper end 122*b*.

The same applies to the first lid section 131. That is, when the first lid body 141 is closed, a tip portion of the first lid body 141 is in contact with or close to the carriage cover 101. A base end portion of the first lid body 141 is fixed to a hinge 142*a* of the first support section 142. The first support section 142 pivotably supports the first lid body 141 by the hinge 142*a*. The first protruding section 143 protrudes from the base end portion of the first lid body 141 toward the fan unit 120. The first protruding section 143 overlaps a case upper end 122*a* in the +Z direction. Therefore, when the irradiation section 70 moves from the first relative position P1 to the second relative position P2, the case upper end 122*a* collides with the first protruding section 143, and pushes the first protruding section 143 in the +Y direction As a result, the first protruding section 143 pivots with the first lid body 141 around the hinge 142*a*, and causes the first lid body 141 to opened upward.

A contact surface 142*b* is formed on the first support section 142. The contact surface 142*b* is formed, for example, by cutting a notch in part of the first support section 142. The contact surface 142*b* is a surface that contacts the first lid body 141 when the first lid body 141 is pivoted upward by a predetermined angle. When the first lid body 141 is pivoted by the first protruding section 143 being pushed by the case upper end 122*a*, the pivoting of the first lid body 141 is restricted where the first lid body 141 contacts the contact surface 142*b*. Therefore, an angle θ at which the first lid body 141 is opened upward does not exceed 90 degrees. When the irradiation section 70 moves from the second relative position P2 to the first relative position P1, the first lid body 141 pivots downward by its own weight to block the airflow F4 because the first protruding section 143 is no longer supported by the case upper end 122*a*.

As described above, in both states of the irradiation section 70 being in the first relative position P1 and in the second relative position P2, the airflow sucked in by the fan unit 120 is limited to the airflow F1 from the upper air intake ports 102*a* and the airflow F2 from the lower air intake ports 102*b*. The airflow F4 from below the carriage 100 is blocked by the lid section 130. As a result, the airflow in the vicinity of the head 80 due to the operation of the fan unit 120 can be suppressed or prevented. Therefore, the fan unit 120 can cool the irradiation section 70 without affecting the print quality of the printing device 1.

1.4. Configuration of Control System of Printing Device

Figure 11:
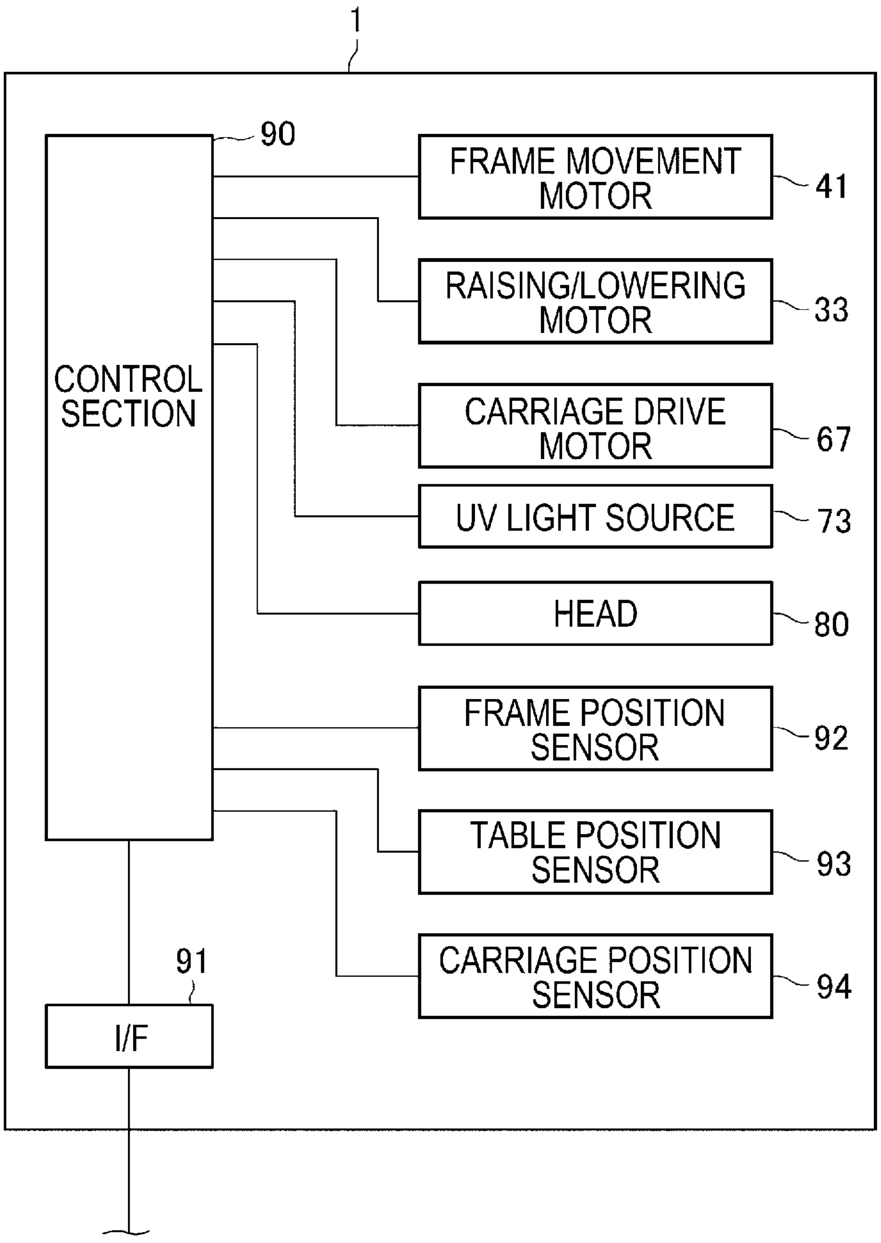
FIG. 11 is a schematic diagram showing a configuration of a control system of the printing device according to the embodiment.

FIG. 11 is a block diagram of the printing device 1, and shows a functional configuration of a control system of the printing device 1. The printing device 1 has a control section 90. The control section 90 has a processor, such as a central processing unit (CPU) or a micro processing unit (MPU), and a storage section. The storage section of the control section 90 has a volatile memory and a nonvolatile storage section. The volatile memory is, for example, a random access memory (RAM). The nonvolatile storage section is composed of a read only memory (ROM), a hard disk, a flash memory, or the like. The control section 90 controls each section of the printing device 1 by executing a program stored in the storage section.

An interface (I/F) 91 is connected to the control section 90. The interface 91 is a communication device that performs wired communication using cables or wireless communication using wireless communication lines. The interface 91 performs communication with an unshown host computer to receive print data. The print data includes image and character data to be printed by the printing device 1 on the medium M, commands that instruct the printing device 1 to perform printing, and other data.

The raising/lowering motor 33, the frame movement motor 41, the carriage drive motor 67, the UV light source 73, and the head 80 are connected to the control section 90. Further, a frame position sensor 92, a table position sensor 93, and a carriage position sensor 94 are connected to the control section 90.

The control section 90 can obtain current values of the current flowing in the raising/lowering motor 33, the frame movement motor 41, and the carriage drive motor 67. The control section 90 detects the load on the raising/lowering motor 33, the frame movement motor 41, and the carriage drive motor 67 from the current values obtained.

The control section 90 controls the UV light source 73 to turn on and off. The control section 90 can control turn-off and turn-on of the light emitting elements 73*a*, which constitute the UV light source, for each row aligned in the front-back direction.

The frame position sensor 92 is a sensor that detects the position of the main frame 51 in the Y-axis. For example, the frame position sensor 92 is a linear encoder located along the guide shaft 15. The table position sensor 93 is a sensor that detects the position of the table 31 in the Z-axis. The table position sensor 93 is, for example, a rotary encoder that detects the amount of rotation of the raising/lowering motor 33 or that detects the amount of rotation of the ball screw in the raising/lowering mechanism 39. The carriage position sensor 94 is a sensor that detects the position of the carriage 100 in the X-axis. For example, the carriage position sensor 94 is a linear encoder located along the carriage guide shaft 63. The control section 90 specifies the positions of the main frame 51, the table 31, and the carriage 100 based on detected values of the frame position sensor 92, the table position sensor 93, and the carriage position sensor 94.

The control section 90 operates each motor based on the print data received by the interface (I/F) 91. More specifically, the control section 90 moves the movement section 50 forward and backward by switching the rotation direction of the frame movement motor 41 and by controlling the start and stop of the rotation of the frame movement motor 41.

The control section 90 moves the table 31 along the Z-axis by switching the rotation direction of the raising/lowering motor 33 and by controlling the start and stop of the rotation of the raising/lowering motor 33. The control section 90 moves the carriage 100 along the X-axis by switching the carriage drive motor 67 and by controlling the start and stop of rotation of the carriage drive motor 67. In these controls, the control section 90 uses the detected values of the frame position sensor 92, the table position sensor 93, and the carriage position sensor 94.

The control section 90 operates the head 80 to eject ink based on the print data received by the interface 91.

1.5. Operation of Printing Device

Figure 12:
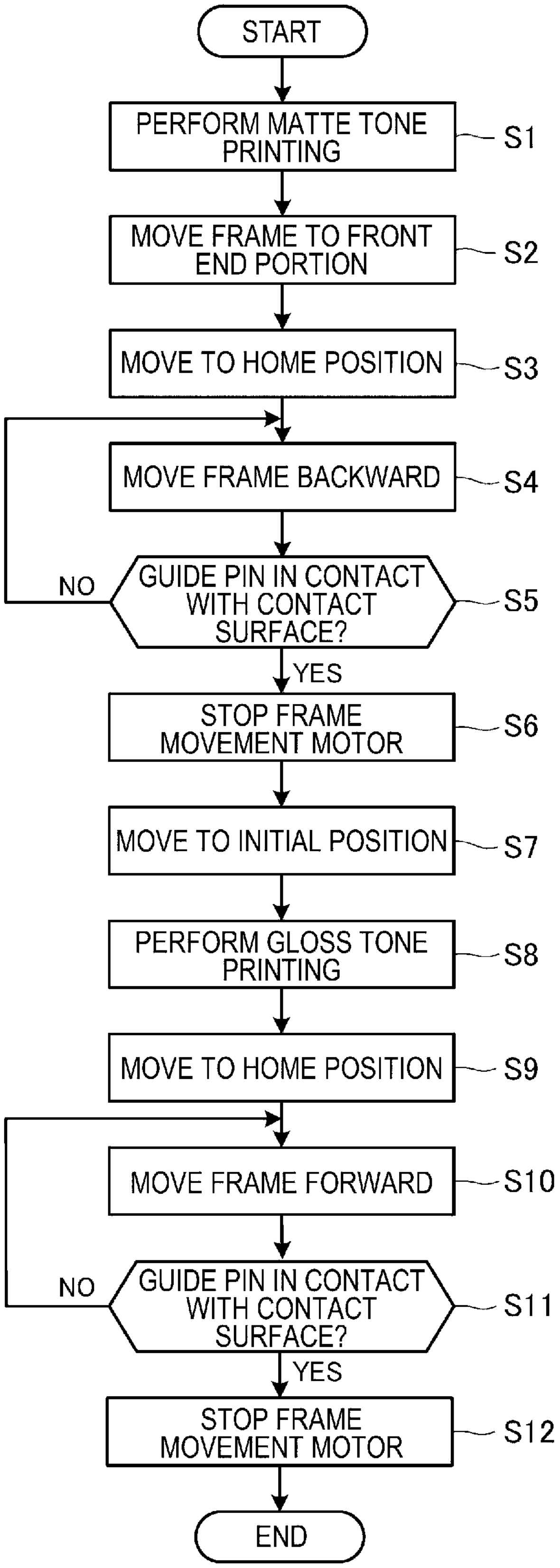
FIG. 12 is a flowchart of a printing operation of the printing device according to the embodiment.

FIG. 12 is a flowchart showing the operation of the printing device 1, and shows the operation when the printing device 1 performs printing. For convenience of explanation, this section describes the operation of the printing device 1 when processing print data that includes instructions to perform both matte tone printing and gloss tone printing on a medium M.

At the time when the printing device 1 starts a printing operation, the irradiation section 70 is in the first relative position P1, as shown in FIG. 3 and FIG. 5. At the time when the printing device 1 starts the printing operation, the carriage 100 is in the home position and the main frame 51 is at the front end portion. At the time when the printing device 1 starts the printing operation, the distance between the nozzles 83 and the medium M is in a state of having been adjusted by the up-and-down movement of the table 31 so that the distance between the nozzles 83 and the medium M is optimal for printing.

In step S1, the printing device 1 performs matte tone printing based on the read print data. In matte tone printing, colored inks are mainly used to print designs, characters, and the like, on the surface of the medium M.

When the printing device 1 starts matte tone printing, the control section 90 drives the frame movement motor 41 to move the main frame 51 backward, that is, in the −Y direction. At this time, the control section 90 specifies the position of the nozzles 83 in the Y-axis from the detection value of the frame position sensor 92. When the position of the nozzles 83 and the ink ejection position that is specified in the print data overlap on the Y-axis, the control section 90 stops driving the frame movement motor 41.

Next, the control section 90 controls the UV light source 73 and turns on the light emitting elements 73*a* at the position overlapping the nozzles 83 in the Y-axis. In this state, the control section 90 drives the carriage drive motor 67 to move the carriage 100 in the right direction, that is, in the +X direction. During the movement of the carriage 100, the control section 90 specifies the position of the nozzles 83 from the detection value of the carriage position sensor 94. When the position of the nozzles 83 and the ink ejection position specified in the print data overlap in the X-axis, the control section 90 controls the head 80 to eject ink from the nozzles 83.

As described above, at the time of ink ejection during matte tone printing, the light emitting elements 73*a*, which are located at positions overlapping the nozzles 83 in the Y-axis, are being lit. Therefore, the ink ejected from the nozzles 83, immediately after being deposited to the medium M, is irradiated with ultraviolet light from the light emitting elements 73*a*, which are turned on. Therefore, the ink deposited to the medium M is cured without waiting for it to become smooth, so the medium M becomes a matte tone finish with a weak gloss.

When the carriage 100 has moved to the right end portion, the control section 90 stops the drive of the carriage drive motor 67. Thereafter, the control section 90 turns off the UV light source 73. As described above, a pass is defined as the one time scanning of the carriage 100 from the home position to the right end portion while the head 80 ejects ink according to the print data. In matte tone printing, after the first pass is completed, the control section 90 drives the carriage drive motor 67 to return the carriage 100 to the home position again. After that, the control section 90 controls the frame movement motor 41 to move the main frame 51 backward by a distance W, which corresponds to the width of the nozzles 83 in the front-back direction, and stops the frame movement motor 41.

After the frame movement motor 41 is stopped, the control section 90 performs another single pass, and returns the carriage 100 to the home position after the end of the pass. After that, the main frame 51 is moved backward again by the distance W. Matte tone printing is completed by repeating the above operation until the nozzles 83 and the irradiation port 71*a* scan the entire region of the medium M targeted for printing.

After the printing device 1 completes matte tone printing, the printing device 1 moves the irradiation section 70 to the second relative position P2 in step S2 to step S6 to perform gloss tone printing.

In step S2, the control section 90 drives the frame movement motor 41 to move the main frame 51 to the front end portion.

In step S3, the control section 90 drives the carriage drive motor 67 to move the carriage 100 to the home position. In this state, the first contact portion 78 of the irradiation section 70 and the second contact portion 14 of the main body section 10 overlap each other in the front-back direction. In addition, the first contact portion 78 is located further forward than is the second contact portion 14.

In step S4, the control section 90 drives the frame movement motor 41 to move the main frame 51 backward. As the main frame 51 moves backward, the first contact portion 78 also moves backward as well. As described above, at the end of step S3, the first contact portion 78 and the second contact portion 14 overlap each other in the front-back direction, and the first contact portion 78 is located further forward than is the second contact portion 14. Therefore, by moving the main frame 51 backward, the first contact portion 78 contacts the second contact portion 14 from the front. This contact exerts a drag force on the first contact portion 78 from the rear toward the front. Immediately after the first contact portion 78 and the second contact portion 14 contact each other, the drag force exerted on the first contact portion 78 is small. Therefore, the plate spring 76 is not immediately disengaged from the first recess 66*a*, and the irradiation section 70 remains in the first relative position P1. From this state, by continuing to drive the frame movement motor 41 further, the drag force exerted on the first contact portion 78 gradually increases. As the drag force exerted on the first contact portion 78 increases, the plate spring 76 is disengaged from the first recess 66*a*, and the irradiation section 70 begins to move forward relative to the head 80. When the main frame 51 moves backward further, the plate spring 76 fits into the second recess 66*b* and the second guide pin 74*b* contacts the second contact surface 64*c*. As a result, the irradiation section 70 is fixed in the second relative position P2. That is, as the carriage 100 moves backward with the first contact portion 78 and the second contact portion 14 in contact, the irradiation section 70 moves forward relative to the head 80.

In step S5, the control section 90 determines whether the second guide pin 74*b* has contacted the second contact surface 64*c*. When the second guide pin 74*b* is in contact with the second contact surface 64*c*, the drag force on the first contact portion 78 is transmitted to the frame movement motor 41 as a load. The control section 90 specifies the load caused by the transmitted drag force by obtaining a current value of the current flowing in the frame movement motor 41. When the current value of the current flowing in the frame movement motor 41 is less than a predetermined value, the control section 90 determines that the second guide pin 74*b* is not in contact with the second contact surface 64*c* (step S5: NO). In this case, the process returns to step S4, and the control section 90 continues to drive the frame movement motor 41 and moves the main frame 51 further backward. On the other hand, when the current value of the current flowing in the frame movement motor 41 exceeds the predetermined value, the control section 90 determines that the second guide pin 74*b* has contacted the second contact surfaces 64*c* (step S5: YES). In this case, the process proceeds to step S6.

In step S6, the control section 90 stops the frame movement motor 41. That is, the control section 90 stops the frame movement motor 41 when the load of the frame movement motor 41 exceeds a predetermined load. As described above, by the operations from step S2 to step S6, the irradiation section 70 is fixed at the second relative position P2.

In step S7, the control section 90 drives the frame movement motor 41 to move the main frame 51 to the front end portion, and drives the carriage drive motor 67 to move the carriage 100 to the home position. At this time, the control section 90 controls the frame movement motor 41 and the carriage drive motor 67 so that the first contact portion 78 and the second contact portion 14 do not contact each other. At the end of step S7, the position after the main frame 51 and the carriage 100 have been moved is the same as the initial position in step S1.

In step S8, the printing device 1 performs gloss tone printing based on the read print date. In gloss tone printing, transparent printing is mainly used, and the surface of part or the entire surface of characters or designs printed in matte tone printing is smoothed according to the print data to strengthen the gloss.

In gloss tone printing, the printing device 1 prints on the medium M by alternately repeating the operation of moving the main frame 51 backward by the distance W and the operation of performing one pass. At this time, since the irradiation section 70 is in the second relative position P2, the irradiation port 71*a* and the nozzles 83 are in the positional relationship shown in FIG. 6. The irradiation port 71*a* overlaps in the Y-axis with the entire range R, which is the range from the front end portion 83*a* of the nozzles 83 to a location that is the distance W forward from that end portion 83*a*.

In step S8, the control section 90 controls the UV light sources 73 to turn on only the light emitting elements 73*a*, which overlap with the range R in the Y-axis, during performance of the pass. Here, the range R shown in FIG. 6 corresponds to the position of the nozzles 83 in the pass, which is one pass prior to the pass being performed. Thus, the ultraviolet light emitted from the UV light source 73 is irradiated to the ink deposited to the medium M in the one pass prior to the pass being performed. In this way, the ink deposited to the medium M in step S8 is cured by ultraviolet light from the UV light sources 73 after the time required to perform one pass has elapsed. Therefore, the ink deposited to the medium M smooths out before being cured, so the medium M becomes a gloss tone finish with strong gloss. Gloss tone printing is completed by scanning the entire region targeted for printing in the medium M by the nozzles 83 and the irradiation port 71*a*.

After the printing device 1 has completed gloss tone printing, then in steps S9 to S12, operations are performed to switch the relative position of the irradiation section 70 in the carriage 100 so that matte tone printing can be performed. In the printing device 1, even when the entire surface of the medium M is to be printed in gloss tone, it is desirable to print designs or the like with matte tone printing as a base layer, and then perform gloss tone printing with transparent ink. Therefore, when the printing device 1 finishes a printing operation, the printing device 1 will end the printing operation in a state where matte tone printing can be performed in the next printing.

In step S9, the control section 90 drives the carriage drive motor 67 to move the carriage 100 to the home position. In this state, the first contact portion 78 and the second contact portion 14 overlap each other in the front-back direction. Further, the second contact portion 14 is fixed near the front end portion of the main body section 10 so that it does not contact the first contact portion 78 during matte tone printing and gloss tone printing. Therefore, at the completion of step S9, the first contact portion 78 is located behind the second contact portion 14.

In step S10, the control section 90 drives the frame movement motor 41 to move the main frame 51 forward. As described above, at the start of step S10, the first contact portion 78 and the second contact portion 14 overlap each other in the front-back direction, and the first contact portion 78 is located behind the second contact portion 14. Therefore, when the main frame 51 moves forward, the first contact portion 78 contacts the second contact portion 14 from behind. This contact exerts a drag force on the first contact portion 78 from the front toward the rear. This drag force increases as the frame movement motor 41 continues to be driven. When the drag force exerted on the first contact portion 78 becomes large, the plate spring 76 is disengaged from the second recess 66*b*. Thereafter, the irradiation section 70 begins to move backward relative to the head 80. When the main frame 51 moves further forward, the plate spring 76 fits into the first recess 66*a*, and the first guide pin 74*a* contacts the first contact surface 64*b*. As a result, the irradiation section 70 is fixed in the first relative position P1. That is, the irradiation section 70 moves backward relative to the head 80 when the carriage 100 moves forward in a state where the first contact portion 78 and the second contact portion 14 are in contact with each other.

In step S11, the control section 90 determines whether the first guide pin 74*a* has contacted the first contact surface 64*b* due to the relative movement of the irradiation section 70 in the carriage 100. Similar to step S5, the control section 90 determines that the first guide pin 74*a* is not in contact with the first contact surface 64*b* (step S11: NO), when the current value of the current flowing in the frame movement motor 41 is less than a predetermined value. In this case, the process returns to step S10, and the control section 90 continues to drive the frame movement motor 41 to move the main frame 51 further forward. On the other hand, when the current value of the current flowing in the frame movement motor 41 exceeds the predetermined value, the control section 90 determines that the first guide pin 74*a* has contacted the first contact surface 64*b* (step S11: YES). In this case, the process proceeds to step S12 and the control section 90 stops the frame movement motor 41. That is, when the load on the frame movement motor 41 exceeds the predetermined load, the control section 90 stops the frame movement motor. At the completion of step S12, a series of operations is finished.

2. Modified Example

Figure 13:
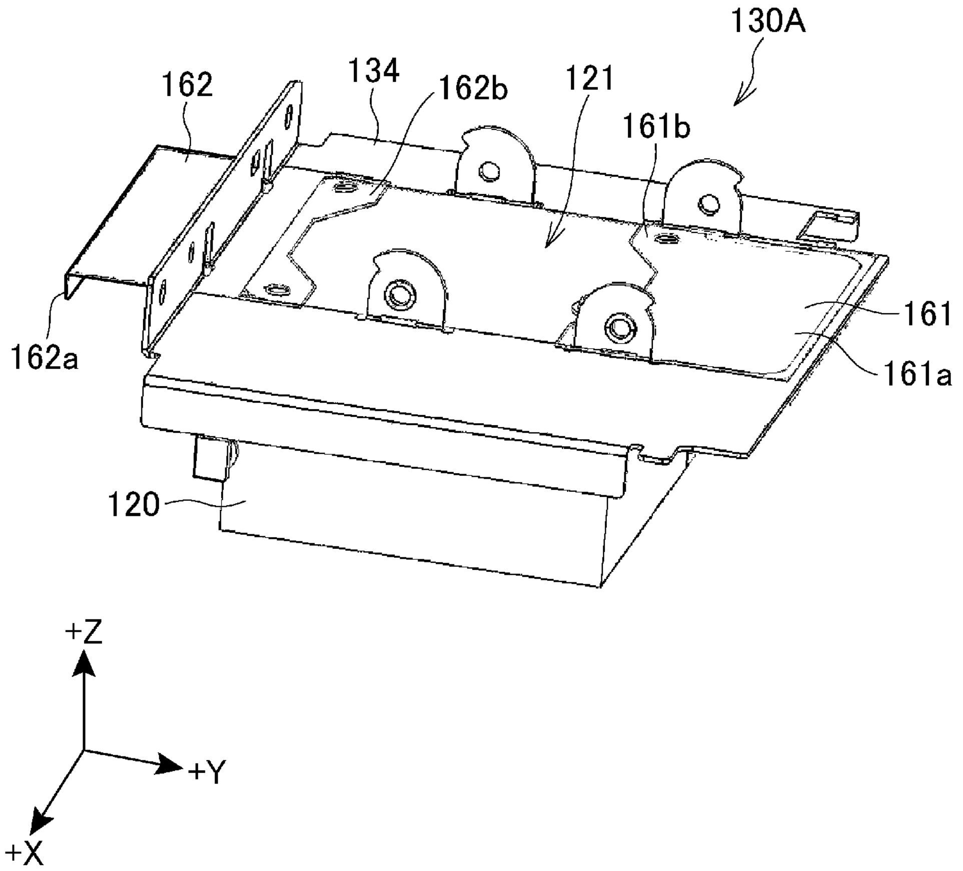
FIG. 13 is a perspective view of a main part of the lid section according to a modified example.

FIG. 13 is a perspective view of a main part of a lid section 130A according to a modified example. The lid section 130A is provided on the carriage 100 instead of the lid section 130 of the above embodiment.

The lid section 130A has a first lid body 161 that blocks the airflow F4 in the state where the irradiation section 70 is in the first relative position P1, and a second lid body 162 that blocks the airflow F4 in the state where the irradiation section 70 is in the second relative position P2. The first lid body 161 and the second lid body 162 correspond to an example of an elastic member.

The first lid body 161 and the second lid body 162 are flexible and elastic sheets. The tip end portion 161*a* of the first lid body 161 contacts the carriage cover 101 in the state where the irradiation section 70 is in the first relative position P1. The base end portion 161*b* of the first lid body 161 is fixed to edges of the top opening 121. The tip end portion 162*a* of the second lid body 162 contacts the cover 103 in the state where the irradiation section 70 is in the second relative position P2. The base end portion 162*b* of the second lid body 162 is fixed to the edges of the top opening 121.

When the irradiation section 70 moves from the first relative position P1 to the second relative position P2, the tip end portion 161*a* of the first lid body 161 is pressed against the carriage cover 101 and bends, for example, downward and progresses. As a result, in the state where the irradiation section 70 is in the second relative position P2, the first lid body 161 is bent and accommodated along the carriage cover 101, and the fan 123 can suck in air from the entire top opening 121.

When the irradiation section 70 moves from the second relative position P2 to the first relative position P1, the tip end portion 162*a* of the second lid body 162 is pressed against the cover 103 and bends, for example, downward and progresses. As a result, in a state where the irradiation section 70 is in the first relative position P1, the second lid body 162 is bent and accommodated along the cover 103, and the fan 123 can suck in air from the entire top opening 121.

Thus, in the state where the irradiation section 70 is in the first relative position P1, the airflow F4 from below the carriage 100 is blocked by the first lid body 161. In a state where the irradiation section 70 is in the second relative position P2, the airflow F4 is blocked by the second lid body 162. As described above, even when the lid section 130A as the modified example is provided on the carriage 100, the airflow F4 caused by the operation of the fan 123 can be suppressed or prevented in the same way as in the above embodiment using the lid section 130.

The first lid body 161 and the second lid body 162 are not limited to elastic sheet-like members. For example, they may be a foldable accordion-shaped members. In this case, the tip end portion 161*a* of the first lid body 161 may be fixed to the carriage cover 101. The tip end portion 162*a* of the second lid body 162 may be fixed to the cover 103. According to these configurations, the first lid body 161 and the second lid body 162 expand or contract as the irradiation section 70 moves from the first relative position P1 to the second relative position P2, or vice versa. In this way, the fan 123 can suck in air from substantially the entire top opening 121. In addition, the space between the irradiation section 70 and the carriage cover 101 and the space between the irradiation section 70 and the cover 103 can be blocked by the first lid body 161 and the second lid body 162 respectively, so that the airflow F4 can be blocked.

3. Effects of Embodiments

As described above, the printing device 1 according to the first embodiment has the carriage 100 that is movable in the first direction along the first axis, and the head 80 that is capable of ejecting ink toward the medium M. The printing device 1 has the irradiation section 70 that is provided alongside the head 80 in the first direction and that is capable of irradiating ultraviolet light toward the medium M. The irradiation section 70 has a cooling unit that cools the irradiation section 70 by airflow. In plan view facing the medium M, the head 80 is located in the first region 100A of the carriage 100, and the irradiation section 70 is located in the second region 100B of the carriage 100. In the second region 100B, the lid section 130 is provided to block the airflow from the side of the carriage 100 facing the medium M to the irradiation section 70. Here, for example, the first axis is the X-axis, and the cooling unit includes the heatsink 110 and the fan unit 120.

According to this configuration, when the cooling unit cools the irradiation section 70 by airflow, the lid section can suppress or prevent airflow flowing between the carriage 100 and the medium M, which is caused by the airflow of the cooling unit. By this configuration, it is possible to prevent the temperature drop of the head 80 by the airflow flowing between the carriage 100 and the medium M, and affecting the print quality of the printing device 1.

In the printing device 1, when the direction along the second axis, which intersects the first axis, is the second direction, the irradiation section 70 can move relative to the head 80 in the second direction. The lid section 130 includes the first lid section 131 and the second lid section 132. The first lid section 131 blocks the airflow at the first relative position P1 of the irradiation section 70, and the second lid section 132 blocks the airflow at the second relative position P2 of the irradiation section 70. Here, for example, the second axis is the Y-axis. The irradiation section 70 is movable in the +Y direction or the −Y direction along the Y-axis, and moves between a first relative position P1 and a second relative position P2.

According to this configuration, in the configuration where the irradiation section 70 can move relative to the head 80, the first lid section 131 or the second lid section 132 can suppress or prevent the airflow flowing between the carriage 100 and the medium M by corresponding to the position of the irradiation section 70. Accordingly, in the configuration where the position of the irradiation section 70 can be switched, the airflow cooling the irradiation section 70 can be prevented from affecting the print quality of the printing device 1.

In the printing device 1, the first lid section 131 and the second lid section 132 are configured to be able to open and close. The first lid section 131 blocks the airflow by being closed at the first relative position P1 of the irradiation section 70, and opens as the irradiation section 70 moves from the first relative position P1 to the second relative position P2. The second lid section 132 blocks the airflow by being closed at the second relative position P2 of the irradiation section 70, and is opens as the irradiation section 70 moves from the second relative position P2 to the first relative position P1.

According to this configuration, the first lid section 131 can suppress or prevent unwanted airflow when the irradiation section 70 is in the first relative position P1, and the second lid section 132 can suppress or prevent unwanted airflow when the irradiation section 70 is in the second relative position P2. Further, the second lid section 132 is open when the irradiation section 70 is in the first relative position P1, and the first lid section 131 is open when the irradiation section 70 is in the second relative position P2. Therefore, in both the first relative position P1 and the second relative position P2, the cooling unit can take in enough air to cool the irradiation section 70 and cool the irradiation section 70 efficiently.

In the printing device 1, the first lid section 131 has the first lid body 141, the first support section 142, which is pivotably supporting the first lid body 141, and the first protruding section 143, which protrudes from the first lid body 141. When the irradiation section 70 moves from the first relative position P1 to the second relative position P2, the first lid body 141 is pivoted to be opened when the irradiation section 70 comes into contact with the first protruding section 143.

According to this configuration, a configuration, in which the first lid section 131 is opened while the irradiation section 70 moves from the first relative position P1 to the second relative position P2, can be realized without using a dedicated power source to move the first lid section 131. Accordingly, unwanted airflow can be suppressed or prevented without complicating the configuration of the carriage 100 or increasing its weight.

In the printing device 1, the second lid section 132 has the second lid body 151, the second support section 152, which is pivotably supporting the second lid body 151, and the second protruding section 153, which protrudes from the second lid body 151. When the irradiation section 70 moves from the second relative position P2 to the second relative position P2, the second lid body 151 pivots open by the irradiation section 70 contacting the second protruding section 153.

According to this configuration, a configuration, in which the second lid section 132 is opened while the irradiation section 70 moves from the second relative position P2 to the first relative position P1, can be realized without using a dedicated power source to move the second lid section 132. Accordingly, unwanted airflow can be suppressed or prevented without complicating the configuration of the carriage 100 or increasing its weight.

In the printing device 1 of the modified example, at least one of the first lid body 161 and the second lid body 162 is composed of an elastic member that deforms elastically with the movement of the irradiation section 70.

According to this configuration, it is easy to realize a configuration that blocks the region where unwanted airflow flows, whether the irradiation section 70 is in the first relative position P1 or in the second relative position P2.

The carriage 100 consists of the carriage cover 101, the air intake port cover 102, the cover 103, and the cover 104, and has the outer casing surrounding the second region 100B. The cooling unit has the fan 123 that sucks air and blows it toward the irradiation section 70. The first lid section 131 closes a space between the outer casing and the intake section of the fan 123 when the irradiation section 70 is in the first relative position P1, and the second lid section 132 closes the space between the outer casing and the intake section of the fan 123 when the irradiation section 70 is in the second relative position P2.

According to this configuration, the first lid section 131 and the second lid section 132 restrict the area in the second region 100B where the airflow sucked in by the fan 123 flows. As a result, the airflow cooling the irradiation section 70 can be prevented from affecting the print quality of the printing device 1.

The outer casing has the upper air intake ports 102*a* and the lower air intake ports 102*b* on the opposite side from the head 80 in the first direction. The fan 123 sucks in air from the upper air intake ports 102*a* and the lower air intake ports 102*b* into the inside of the outer casing.

According to this configuration, the airflow sucked in by the fan 123 is prevented from flowing in the vicinity of the head 80. As a result, the airflow cooling the irradiation section 70 can be prevented from affecting the print quality of the printing device 1.

The cooling unit exhausts the airflow that has cooled the irradiation section 70 to the opposite side from the head 80 in the first direction.

According to this configuration, the airflow that has cooled the irradiation section 70 is discarded in a direction that does not affect the head 80. As a result, the airflow cooling the irradiation section 70 can be prevented from affecting the print quality of the printing device 1.

4. Other Embodiments

The above embodiment shows only one specific example of the present disclosure being applied. The present disclosure is not limited to the configuration of the above embodiment, but can be implemented in various forms to the extent that it does not depart from the scope of the disclosure.

In the above embodiment, the configuration in which the irradiation section 70 is movable in the direction along the X-axis is not limited to the above described aspects. For example, in the above embodiment, the configuration for moving the irradiation section 70 is shown with the first contact portion 78 and the second contact portion 14. This configuration is an example, and for example, either or both of the first contact portion 78 and the second contact portion 14 may be composed of the elastic member. This elastic member may be made of rubber or silicon, or may be a coil spring or a plate spring.

At least some of the functional blocks shown in FIG. 11 may be realized by hardware or may be realized by a collaboration of hardware and software. The processing units in the flowchart in FIG. 12 are divided according to the main processing content in order to facilitate understanding of the operation of the printing device 1. Therefore, the embodiment is not limited by the way of division and names of the processing units shown in the drawings.

What is claimed is:

1. A printing device comprising:

a carriage configured to move in a first direction along a first axis;

a head configured to eject ink onto a medium; and an irradiation section that is provided alongside the head in the first direction and that is configured to irradiate ultraviolet light toward the medium, wherein the irradiation section has a cooling unit that cools the irradiation section by airflow, in a plan view facing the medium, the head is disposed in a first region of the carriage and the irradiation section is disposed in a second region of the carriage, and in the second region, at least one lid section is provided to block an airflow from a side in which the carriage faces the medium to the irradiation section.

2. The printing device according to claim 1, wherein a second direction is a direction along a second axis that intersects the first axis, the irradiation section is movable relative to the head in the second direction, the at least one lid section includes a first lid section and a second lid section, the first lid section blocks airflow at a first position of the irradiation section, and the second lid section blocks airflow at a second position of the irradiation section.

3. The printing device according to claim 2, wherein the first lid section and the second lid section are configured to open and close, the first lid section blocks airflow by closing when the irradiation section is in the first position and opens as the irradiation section moves from the first position to the second position, and the second lid section blocks airflow by closing when the irradiation section is in the second position and opens as the irradiation section moves from the second position to the first position.

4. The printing device according to claim 3, wherein the first lid section has a first lid body, a first support section that pivotably supports the first lid body, and a first protruding section that protrudes from the first lid body and when the irradiation section moves from the first position to the second position, the first lid body is pivoted open by the irradiation section contacting the first protruding section.

5. The printing device according to claim 4, wherein the second lid section has a second lid body, a second support section that pivotably supports the second lid body, and a second protruding section that protrudes from the second lid body and when the irradiation section moves from the second position to the first position, the second lid body is pivoted open by the irradiation section contacting the second protruding section.

6. The printing device according to claim 2, wherein at least one of the first lid section and the second lid section is composed of an elastic member that deforms elastically as the irradiation section moves.

7. The printing device according to claim 2, wherein the carriage has an outer casing that surrounds the second region, the cooling unit has a fan that sucks air and blows it toward the irradiation section, the first lid section blocks a space between the outer casing and an intake section of the fan when the irradiation section is in the first position, and the second lid section blocks a space between the outer casing and an intake section of the fan when the irradiation section is in the second position.

8. The printing device according to claim 7, wherein the outer casing has an opening on an opposite side from the head in the first direction and the fan sucks in air that flows into the outer casing through the opening.

9. The printing device according to claim 8, wherein the cooling unit exhausts airflow that has cooled the irradiation section to the opposite side from the head in the first direction.

* * * * *